(12) United States Patent
Cao

(10) Patent No.: US 12,204,938 B2
(45) Date of Patent: Jan. 21, 2025

(54) PIPELINE-BASED MACHINE LEARNING METHOD AND APPARATUS, ELECTRONIC DEVICE, AND COMPUTER READABLE STORAGE MEDIUM

(71) Applicant: TENCENT TECHNOLOGY (SHENZHEN) COMPANY LIMITED, Shenzhen (CN)

(72) Inventor: Luyang Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 68 days.

(21) Appl. No.: 18/196,326

(22) Filed: May 11, 2023

(65) Prior Publication Data
US 2023/0281040 A1 Sep. 7, 2023

Related U.S. Application Data

(63) Continuation of application No. PCT/CN2022/113272, filed on Aug. 18, 2022.

(30) Foreign Application Priority Data

Sep. 23, 2021 (CN) .......................... 202111112725.6

(51) Int. Cl.
*G06F 9/48* (2006.01)
*G06F 11/30* (2006.01)

(52) U.S. Cl.
CPC ........ *G06F 9/4881* (2013.01); *G06F 11/3051* (2013.01)

(58) Field of Classification Search
CPC .. G06F 9/4881; G06F 11/3051; G06F 9/5038; G06F 8/36; G06N 20/00
See application file for complete search history.

(56) References Cited

U.S. PATENT DOCUMENTS

2016/0004936 A1* 1/2016 Sawney ................. G06F 18/40
382/159
2017/0011170 A1* 1/2017 Sadowski ................ C12M 1/36
(Continued)

FOREIGN PATENT DOCUMENTS

| CN | 110110858 A | 8/2019 |
| CN | 112598134 A | 4/2021 |

(Continued)

OTHER PUBLICATIONS

The World Intellectual Property Organization (WIPO) International Search Report for PCT/CN2022/113272 Nov. 17, 2022 5 Pages (including translation).

*Primary Examiner* — Farley Abad
(74) *Attorney, Agent, or Firm* — ANOVALAW GROUP PLLC

(57) ABSTRACT

A pipeline-based machine learning method includes: determining a plurality of target components from candidate components configured to construct a machine learning model; performing standardization processing on input data and output data of the plurality of target components to obtain a plurality of standardized components respectively corresponding to the plurality of target components; assembling, based on a connection relationship between the plurality of standardized components, the plurality of standardized components into a pipeline corresponding to the machine learning model; performing scheduling processing on the plurality of standardized components included in the pipeline, to obtain a scheduling result; and executing, based on THE scheduling result, a machine learning task corresponding to the machine learning model.

20 Claims, 9 Drawing Sheets

(56) References Cited

U.S. PATENT DOCUMENTS

| | | | | |
|---|---|---|---|---|
| 2020/0372307 | A1* | 11/2020 | Arun | G06F 18/2178 |
| 2021/0065048 | A1* | 3/2021 | Salonidis | G06N 20/00 |
| 2021/0081837 | A1* | 3/2021 | Polleri | G06N 5/022 |
| 2021/0326736 | A1* | 10/2021 | Kishimoto | G06F 18/217 |

FOREIGN PATENT DOCUMENTS

| | | | |
|---|---|---|---|
| WO | 2020201835 | A1 | 10/2020 |
| WO | 2021038432 | A1 | 3/2021 |

* cited by examiner

PIPELINE-BASED MACHINE LEARNING METHOD AND APPARATUS, ELECTRONIC DEVICE, AND COMPUTER READABLE STORAGE MEDIUM

CROSS-REFERENCES TO RELATED APPLICATIONS

This application is a continuation application of PCT Patent Application No. PCT/CN2022/113272, entitled "PIPELINE-BASED MACHINE LEARNING METHOD AND APPARATUS, ELECTRONIC DEVICE, COMPUTER-READABLE STORAGE MEDIUM, AND COMPUTER PROGRAM PRODUCT" and filed on Aug. 18, 2022, which claims priority to Chinese Patent Application No. 202111112725.6 filed on Sep. 23, 2021, the entire contents of both of which are incorporated herein by reference.

FIELD OF THE TECHNOLOGY

The present disclosure relates to artificial intelligence technologies, and in particular, to a pipeline-based machine learning method and apparatus, an electronic device, a computer readable storage medium, and a computer program product.

BACKGROUND OF THE DISCLOSURE

Artificial intelligence (AI) is a comprehensive technology of computer science. By studying design principles and implementation methods of various intelligent machines, AI makes the machines have functions of perception, inference, and decision-making. The artificial intelligence technology is an integrated discipline, covering a wide range of fields, such as natural language processing technology and machine learning/deep learning. With the development of technologies, the artificial intelligence technology will be applied in more fields and play more and more important values.

In a related technology, a machine learning model is constructed based on the artificial intelligence technology. Because the scale of the machine learning model becomes increasingly large, a large amount of computer resources need to be consumed to construct a complete machine learning model, thereby affecting efficiency of constructing the machine learning model.

SUMMARY

Embodiments of the present disclosure provide a pipeline-based machine learning method and apparatus, an electronic device, a computer readable storage medium, and a computer program product, which can reduce resource overheads of machine learning and improve efficiency of constructing a machine learning model.

Technical solutions in the embodiments of the present disclosure are implemented as follows:

An embodiment of the present disclosure provides a pipeline-based machine learning method, where the method is performed by an electronic device and includes: determining a plurality of target components from candidate components configured to construct a machine learning model; performing standardization processing on input data and output data of the plurality of target components to obtain a plurality of standardized components respectively corresponding to the plurality of target components; assembling, based on a connection relationship between the plurality of standardized components, the plurality of standardized components into a pipeline corresponding to the machine learning model; performing scheduling processing on the plurality of standardized components included in the pipeline, to obtain a scheduling result; and executing, based on THE scheduling result, a machine learning task corresponding to the machine learning model.

An embodiment of the present disclosure provides a pipeline-based machine learning apparatus, including: a determining module, configured to determine a plurality of target components from candidate components configured to construct a machine learning model; a standardization module, configured to perform standardization processing on input data and output data of the plurality of target components to obtain a plurality of standardized components respectively corresponding to the plurality of target components; an assembly module, configured to assemble, based on a connection relationship between the plurality of standardized components, the plurality of standardized components into a pipeline corresponding to the machine learning model; and a scheduling module, configured to perform scheduling processing on the plurality of standardized components included in the pipeline, to obtain a scheduling result; and execute, based on the scheduling result, a machine learning task corresponding to the machine learning model.

An embodiment of the present disclosure provides an electronic device for machine learning, and the electronic device includes: at least one memory, configured to store executable instructions; and at least one processor, configured to: when executing the computer executable instructions stored in the memory, implement the pipeline-based machine learning method provided in the embodiment of the present disclosure.

An embodiment of the present disclosure provides a non-transitory computer readable storage medium, storing computer executable instructions, when executed by a processor, implementing the pipeline-based machine learning method provided in the embodiment of the present disclosure.

The embodiments of the present disclosure have the following beneficial effects:

A plurality of target components are determined from candidate components configured to construct a machine learning model, and the target components are standardized, so as to construct a pipeline for the machine learning model based on the standardized components, and execute a machine learning task by using the pipeline. Because the plurality of target components are determined from the candidate components, the pipeline can be freely constructed based on the candidate components, so as to implement reuse of the candidate components, improve utilization of the components, and reduce waste of a computer resource. In addition, because the machine learning model is constructed by using a component as a unit, efficiency of constructing the machine learning model by an electronic device is effectively improved.

DESCRIPTION OF EMBODIMENTS

Figure 1:
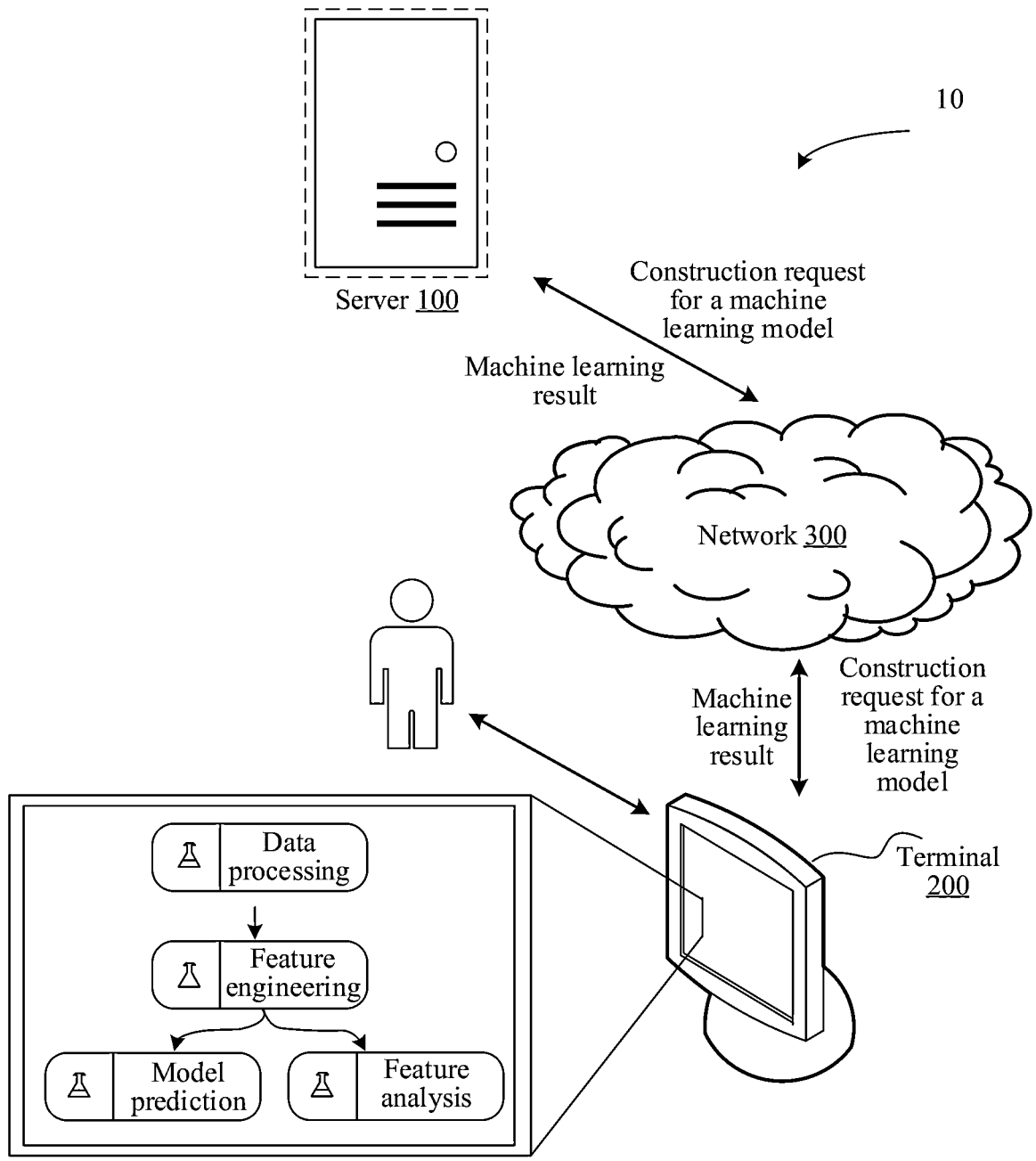
FIG. 1 is a schematic architectural diagram of a machine learning system according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following description, the term "first\second" is merely used for distinguishing between similar objects, and does not represent a specific sorting for the objects. It may be understood that a specific sequence or an order of "first\second" may be interchanged when allowed, so that the embodiments of the present disclosure described herein can be implemented in a sequence other than that shown or described herein.

Unless otherwise defined, meanings of all technical and scientific terms used in this specification are the same as those usually understood by a person skilled in the art to which the present disclosure belongs. The terms used in this specification are merely intended to describe the embodiments of the present disclosure, and are not intended to limit the present disclosure.

Before the embodiments of the present disclosure are further described in detail, a description is made on nouns and terms in the embodiments of the present disclosure, and the nouns and terms in the embodiments of the present disclosure are applicable to the following explanations.

1) In response to: It indicates a condition or a state on which an executed operation depends. When the condition or the state on which the executed operation depends is met, one or more executed operations may be in real time, or may have a set delay. Unless otherwise specified, there is no limitation on an execution sequence of a plurality of operations performed.

2) Pipeline: An overall data processing process of a machine learning model may be split into a data processing process corresponding to each component, and all components are combined together, so that a machine learning model can be executed and a result corresponding to a machine learning task is obtained successfully. A process of combining various parts of the machine learning process is referred to as a pipeline. In machine learning, a pipeline is constructed so that data "flows" along the pipeline, and useful information is finally obtained from an original format. Data input in each step of the pipeline is processed in the previous step, that is, output of a component is input to a next component. A machine learning pipeline is represented in the embodiments of the present disclosure. A machine learning modeling process may be disassembled into a plurality of steps, and each step is one component or node of the machine learning pipeline.

3) A component is a simple encapsulation of data and methods. A component can have its own attributes and methods. In the embodiments of the present disclosure, structures of machine learning models for different machine learning tasks are different. For example, for a machine learning model for an image recognition task, convolution processing needs to be performed on an image, and then full connection processing needs to be performed on a convolution result. In this case, a feature extraction component configured to execute the convolution processing task is needed, and a full connection component configured to execute the full connection task is further needed.

4) Application programming interface (API): indicates some predefined functions, or conventions for joining different components of a software system. The objective is to provide applications and developers with the ability to access a set of routines based on a piece of software or hardware, eliminating the need for developers to access source code or to understand details of internal working mechanisms.

5) Blockchain: It is a storage structure of an encrypted, chained transaction formed by a block.

6) Blockchain network: It is a set of nodes that incorporate new blocks into a blockchain by consensus.

The machine learning model described in the embodiments of the present disclosure may be applied to various fields, for example, an image recognition neural network or a text recommendation neural network. That is, the neural network model in the embodiments of the present disclosure is not limited to a specific field.

Embodiments of the present disclosure provide a pipeline-based machine learning method and apparatus, an electronic device, a computer readable storage medium, and a computer program product, which can reduce resource overheads of machine learning and improve efficiency of constructing a machine learning model.

The pipeline-based machine learning method provided in the embodiments of the present disclosure may be independently implemented by a terminal/server; or may be cooperatively implemented by the terminal and the server. For example, the terminal solely undertakes the pipeline-based machine learning method described below, or the terminal sends a construction request for a machine learning model to the server, and the server executes the pipeline-based machine learning method according to the received construction request for a machine learning model, so as to execute a machine learning task corresponding to the machine learning model.

An electronic device for machine learning provided in the embodiments of the present disclosure may be various types of terminal devices or servers. The server may be an independent physical server, or may be a server cluster or a distributed system formed by a plurality of physical servers, or may be a cloud server that provides a cloud computing service. The terminal may be a smartphone, a tablet computer, a notebook computer, a desktop computer, a smart speaker, a smart watch, a smart TV, an in-vehicle terminal, or the like, but is not limited thereto. The terminal and the server may be directly or indirectly connected in a wired or wireless communication manner, which is not limited in the embodiments of the present disclosure.

A server is used as an example. For example, the server may be a server cluster deployed in a cloud, and AI as a Service (AIaaS) is opened to a user. An AIaaS platform splits several types of common AI services, and provides an independent or packaged service in the cloud. This service mode is similar to an AI theme store, and all users may access, by using an application programming interface, one or more artificial intelligence services provided by using the AIaaS platform.

For example, an artificial intelligence cloud service may be a machine learning service, that is, a server in the cloud encapsulates a pipeline-based machine learning program provided in the embodiments of the present disclosure. A developer invokes, by using a terminal (running with a client, for example, a machine learning client), a machine learning service in a cloud service, so that a server deployed in the cloud invokes an encapsulated pipeline-based machine learning program, determines a plurality of target components from candidate components used for constructing a machine learning model, performs standardized processing on input data and output data of the plurality of target components, assembles the plurality of standardized components into a pipeline based on an obtained connection relationship between the standardized components, performs scheduling processing on the plurality of standardized components in the pipeline, and executes, based on a scheduling result, a machine learning task corresponding to the machine learning model. The machine learning model may be an image recognition neural network model, a text recommendation neural network model, or the like.

In an implementation scenario, to construct an image recognition neural network model, a server or a terminal may determine a plurality of target components from candidate components used for constructing an image recognition neural network model, perform standardized processing on input data and output data of the plurality of target components, assemble the plurality of standardized components into an image recognition pipeline based on an obtained connection relationship between the standardized components, perform scheduling processing on the plurality of standardized components in the image recognition pipeline, and perform, based on a scheduling result, an image recognition task corresponding to the image recognition neural network model.

For example, in a face recognition system, a pipeline-based machine learning function provided in the embodiments of the present disclosure is invoked. For example, for a face, a plurality of target components are determined from candidate components used for constructing a face recognition model, input data and output data of the plurality of target components are standardized, the plurality of standardized components are assembled into a face recognition pipeline based on a obtained connection relationship between the standardized components, scheduling processing is performed on the plurality of standardized components in the face recognition pipeline, and corresponding face data, for example, a probability of a face belonging to a user, is predicted based on a scheduling result, so as to perform face recognition on a pedestrian who needs to pass an access control door, and enhance a safety coefficient of the access control door.

The scheduling result refers to a result outputted by the last standardized component in a target pipeline. For example, if the last standardized component is a component configured to perform full connection processing, the scheduling result outputted by the last standardized component is a probability, and the probability is used for representing a probability of a face belonging to a user, so that a user to which the recognized face belongs can be predicted.

In an implementation scenario, to construct a text recommendation neural network model, a server or a terminal may determine a plurality of target components from candidate components used for constructing a text recommendation model, perform standardized processing on input data and output data of the plurality of target components, assemble the plurality of standardized components into a text recommendation pipeline based on an obtained connection relationship between the standardized components, perform scheduling processing on the plurality of standardized components in the text recommendation pipeline, and perform, based on a scheduling result, a text recommendation task corresponding to the text recommendation neural network model.

For example, in a news recommendation system, a pipeline-based machine learning function provided in the embodiments of the present disclosure is invoked. A text recommendation task includes a news click rate prediction task and a news exposure rate prediction task. For example, for news recommendation, a plurality of target components are determined from candidate components used for constructing a news recommendation model, and standardization processing is performed on input data and output data of the plurality of target components. Based on an obtained connection relationship between the standardized components, the plurality of standardized components are assembled into a news recommendation pipeline, scheduling processing is performed on the plurality of standardized components in the news recommendation pipeline, and a click rate and an exposure rate of news are predicted based on a scheduling result. With reference to the click rate and the exposure rate of the news, it is determined whether the news is recommended, so as to improve accuracy of news recommendation and recommend news that better meets a user's interest to the user.

Referring to FIG. 1, FIG. 1 is a schematic architectural diagram of a machine learning system 100 according to an embodiment of the present disclosure. A terminal 200 connects to a server 100 by using a network 300. The network 300 may be a wide area network, a local area network, or a combination of the two.

The terminal 200 (running with a client, for example, a configuration client) may be used for obtaining a construction request for a machine learning model. For example, after a user selects a plurality of components from the client, the terminal automatically obtains the construction request for the machine learning model (including the selected components).

In some embodiments, that the electronic device is a terminal is used as an example. The pipeline-based machine learning method provided in this embodiment of the present disclosure may be implemented by the terminal. For example, the terminal 200 determines a plurality of target components from candidate components used for constructing a machine learning model, performs standardization processing on input data and output data of the plurality of target components, assembles the plurality of standardized components into a pipeline based on an obtained connection relationship between the standardized components, performs scheduling processing on the plurality of standardized components included in the pipeline, and executes a machine learning task corresponding to the machine learning model based on a scheduling result; for example, for a face, performs scheduling processing on a plurality of standardized components included in a face recognition pipeline based on a machine learning task corresponding to the machine learning model, to predict corresponding face data, for example, a probability of a face belonging to a user, so as to perform face recognition on a pedestrian who needs to pass an access control door, and enhance a safety coefficient of the access control door.

In some embodiments, the pipeline-based machine learning method provided in this embodiment of the present disclosure may alternatively be cooperatively implemented by a server and a terminal. For example, the terminal 200 determines a plurality of target components from candidate components used for constructing a machine learning model, automatically obtains a construction request (including the plurality of target components) for the machine learning model, and sends the construction request for the machine learning model to the server 100. The server 100 performs standardization processing on input data and output data of the plurality of target components, assembles the plurality of standardized components into a pipeline based on an obtained connection relationship between the standardized components, performs scheduling processing on the plurality of standardized components included in the pipeline, executes, based on a scheduling result, a machine learning task corresponding to the machine learning model, and sends an executed machine learning result to the terminal 200. For example, for news recommendation, the terminal 200 determines a plurality of target components from candidate components used for constructing a news recommendation model, and sends the plurality of target components to the server 100. The server 100 performs standardization processing on input data and output data of the plurality of target components, assembles the plurality of standardized components into a news recommendation pipeline based on an obtained connection relationship between the standardized components, performs scheduling processing on the plurality of standardized components included in the news recommendation pipeline, predicts a click rate and an exposure rate of the news based on a scheduling result, and determines, with reference to the click rate and the exposure rate of the news, whether to recommend the news. When it is determined that the news needs to be recommended, the server 100 sends the news to the terminal 200, so as to recommend, to the user, news that better meets interests of the user.

Specifically, a ratio of a click rate to an exposure rate of each piece of candidate news is determined, a plurality of pieces of candidate news are sorted in descending order of ratios, and candidate news that occupies 10% of a total quantity of candidate news and that is top ranked is used as news that needs to be recommended.

In some embodiments, the terminal or the server may run a computer program to implement the pipeline-based machine learning method provided in this embodiment of the present disclosure. For example, the computer program may be a native program or a software module in an operating system; may be a local (Native) application (APP), that is, a program that can be run only after being installed in an operating system; or may be an applet, that is, a program that can be run by downloading it to a browser environment, for example, a shopping applet; or may be an applet that can be embedded into any APP. In summary, the computer program may be an application, a module, or a plug-in in any form.

In some embodiments, the server 100 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. The cloud service may be a machine learning service, and is invoked by the terminal.

In some embodiments, a plurality of servers may form a blockchain, and the server 100 is a node on the blockchain. There may be an information connection between each node in the blockchain, and information transmission may be performed between the nodes by using the information connection. Data (for example, machine learning logic and a machine learning task) related to the pipeline-based machine learning method provided in this embodiment of the present disclosure may be stored in the blockchain.

Figure 12:
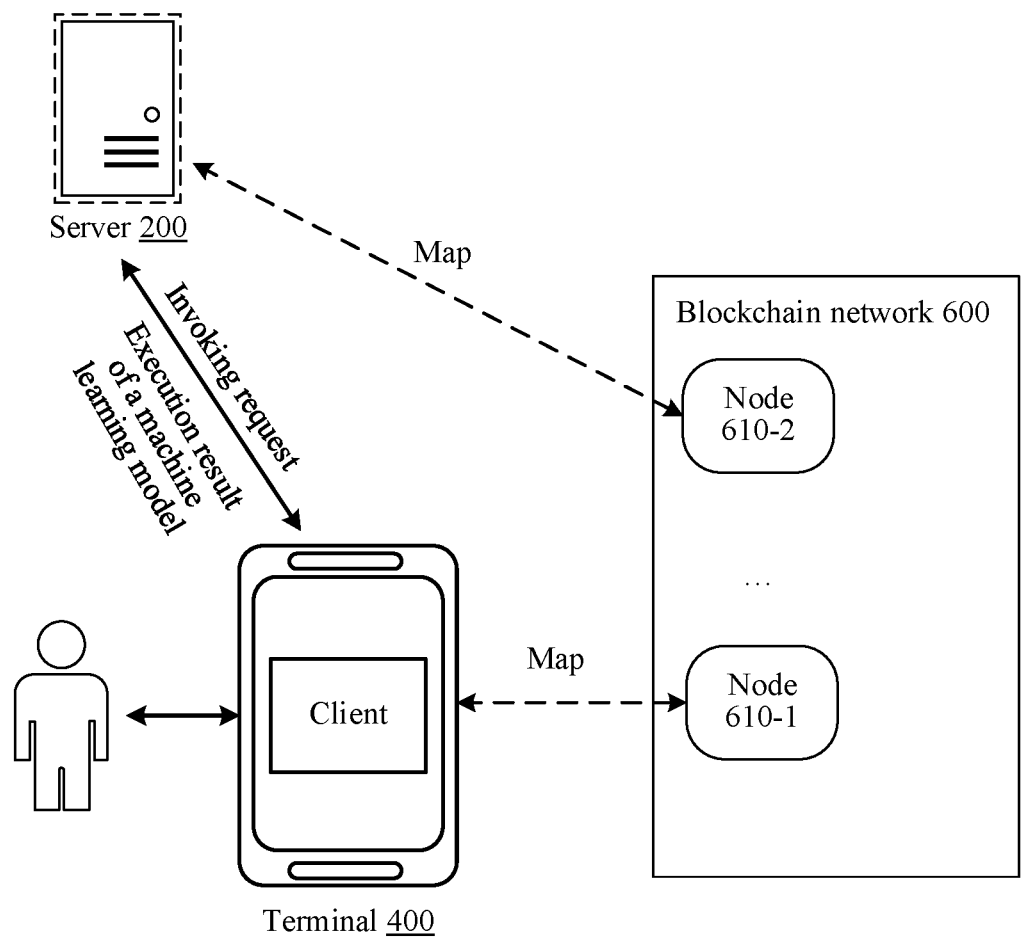
FIG. 12 is a schematic structural diagram of a machine learning system based on a blockchain network according to an embodiment of the present disclosure.

In some embodiments, referring to FIG. 12, FIG. 12 is a schematic structural diagram of a machine learning system based on a blockchain network according to an embodiment of the present disclosure. The following describes an exemplary application based on a blockchain network according to an embodiment of the present disclosure. Referring to FIG. 12, a blockchain network 600 (for example, a node 610-1 and a node 610-2 that are included in the blockchain network 600 are shown), a server 200, and a terminal 400 are separately described below.

Both the server 200 (mapped to the node 610-2) and the terminal 400 (mapped to the node 610-1) may join the blockchain network 600 to become a node in the blockchain network 600. FIG. 12 exemplarily shows mapping the terminal 400 to the node 610-1 in the blockchain network 600. Each node (for example, the node 610-1 and the node 610-2) has a consensus function and an accounting function (that is, maintaining a status database, for example, a key-value database).

Execution logic of each component is recorded in a status database of each node (for example, the node 610-1), so that the terminal 400 can invoke execution logic of each component.

In some embodiments, in response to an invoking request of a terminal, a plurality of servers 200 (each server is mapped to one node in a blockchain network) may invoke a target component based on the invoking request to execute a machine learning task. For an execution result, when a quantity of nodes that achieve consensus exceeds a node quantity threshold, it is determined that the execution result achieves consensus. The server 200 (mapped to the node 610-2) sends the execution result that achieves consensus to the terminal 400 (mapped to the node 610-1). Because the execution result is obtained after consensus is performed by the plurality of servers, reliability of a machine learning model can be effectively improved. In addition, because the blockchain network has a feature of being not easy to be tampered with, execution logic of a target component stored on the blockchain is not maliciously tampered with.

Figure 2:
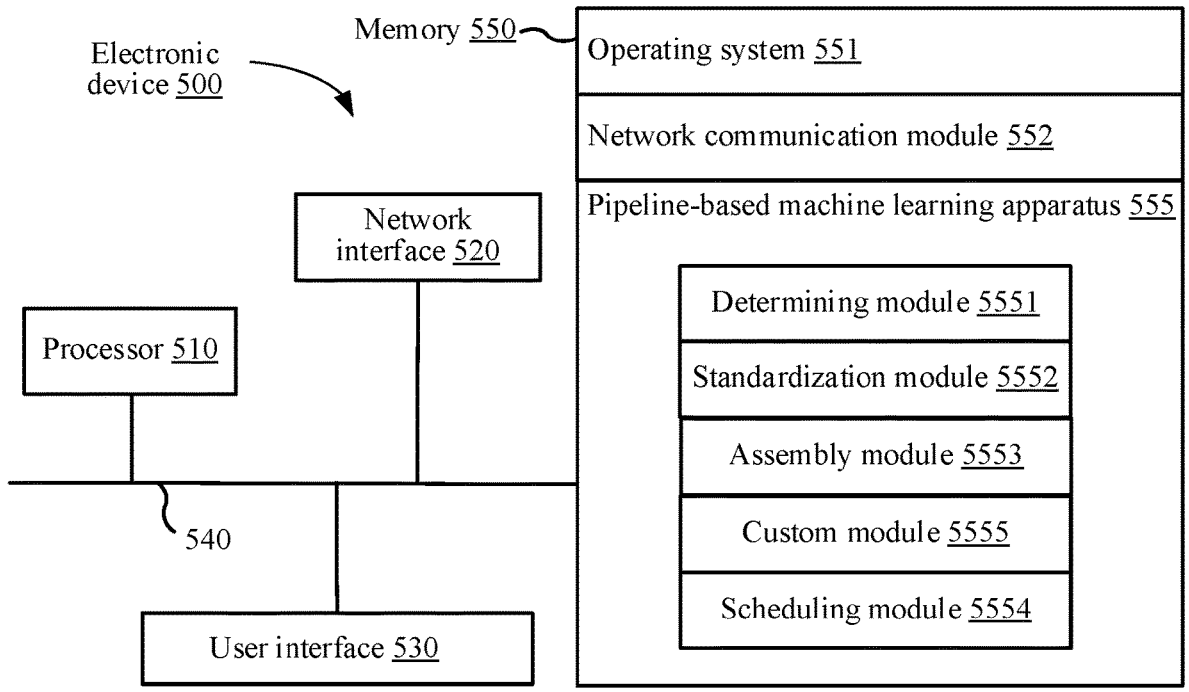
FIG. 2 is a schematic structural diagram of an electronic device 500 for machine learning according to an embodiment of the present disclosure.

The following describes a structure of an electronic device used for machine learning according to an embodiment of the present disclosure. Referring to FIG. 2, FIG. 2 is a schematic structural diagram of an electronic device 500 used for machine learning according to an embodiment of the present disclosure. An example in which the electronic device 500 is a terminal is used for description. The electronic device 500 used for machine learning shown in FIG. 2 includes: at least one processor 510, a memory 550, at least one network interface 520, and a user interface 530. Components in the electronic device 500 are coupled together by using a bus system 540. It may be understood that, the bus system 540 is configured to implement connection and communication between the components. In addition to a data bus, the bus system 540 further includes a power bus, a control bus, and a status signal bus. However, for a clear description, all types of buses in FIG. 2 are marked as the bus system 540.

The processor 510 may be an integrated circuit chip, and has a signal processing capability, for example, a general-purpose processor, a digital signal processor (DSP), another programmable logic device, a discrete gate or transistor logic device, or a discrete hardware component. The general-purpose processor may be a microprocessor or any processor.

The memory 550 includes a volatile memory or a non-volatile memory, or may include both a volatile memory and a non-volatile memory. The non-volatile memory may be a read-only memory (ROM), and the volatile memory may be a random access memory (RAM). The memory 550 described in this embodiment of the present disclosure is intended to include any suitable type of memory. The memory 550 may include one or more storage devices that are physically away from the processor 510.

In some embodiments, the memory 550 can store data to support various operations, and examples of the data include programs, modules, and data structures, or subsets or supersets thereof, as illustrated below.

The operating system 551 includes system programs used for processing various basic system services and executing hardware-related tasks, such as a framework layer, a core library layer, and a driver layer, and is used for implementing various basic services and processing hardware-based tasks.

The network communication module 552 is configured to reach another computing device by using one or more (wired or wireless) network interfaces 520. An exemplary network interface 520 includes: Bluetooth, wireless compatibility authentication (Wi-Fi), universal serial bus (USB), and the like;

In some embodiments, the pipeline-based machine learning apparatus provided in this embodiment of the present disclosure may be implemented in a software manner. The pipeline-based machine learning apparatus provided in this embodiment of the present disclosure may be provided in various software embodiments, including various forms of an application, software, a software module, a script, or code.

FIG. 2 shows a pipeline-based machine learning apparatus 555 stored in the memory 550. The pipeline-based machine learning apparatus 555 may be software in a form of a program, a plug-in, or the like, and includes a series of modules, including a determining module 5551, a standardization module 5552, an assembly module 5553, a scheduling module 5554, and a custom module 5555. These modules are logical. Therefore, any combination or further splitting may be performed according to implemented functions. Functions of the modules are described below.

Figure 3A:
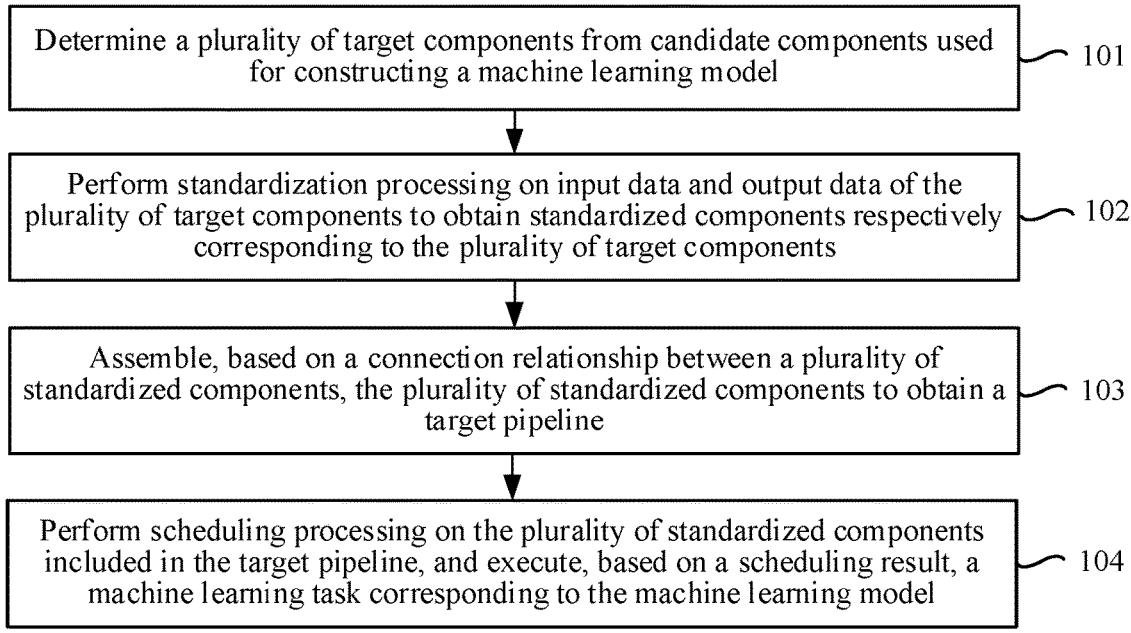
FIG. 3A and FIG. 3B are schematic flowcharts of a pipeline-based machine learning method according to an embodiment of the present disclosure.

As described above, the pipeline-based machine learning method provided in this embodiment of the present disclosure may be implemented by various types of electronic devices. Referring to FIG. 3A, FIG. 3A is a schematic flowchart of a pipeline-based machine learning method according to an embodiment of the present disclosure, and description is provided with reference to steps shown in FIG. 3A.

In step 101, determine a plurality of target components from candidate components used for constructing a machine learning model.

For example, candidate components used for constructing various machine learning models are preset. Subsequently, when some candidate components need to be used for constructing a machine learning model, a selected candidate component is used as a target component used for constructing the machine learning model. Because the candidate component may also be used for constructing another machine learning model, the candidate component may be reused. For example, candidate components used for constructing the machine learning model include a component 1, a component 2, a component 3, and a component 4, and the component 1, the component 2, and the component 3 are used as target components used for constructing the machine learning model.

In some embodiments, in step 101, a plurality of target components may be determined from candidate components used for constructing a machine learning model by using the following technical solutions: displaying, in a human-machine interaction interface, a candidate component used for constructing a machine learning model; and using a selected candidate component as the target component in response to a selection operation for the candidate component. In this embodiment of the present disclosure, freedom and a visualization degree of constructing the machine learning can be improved. Because another machine learning model may be constructed in a manner of reusing candidate components, flexibility of constructing the machine learning model is improved, and costs of constructing the machine learning model are effectively reduced.

Figure 4:
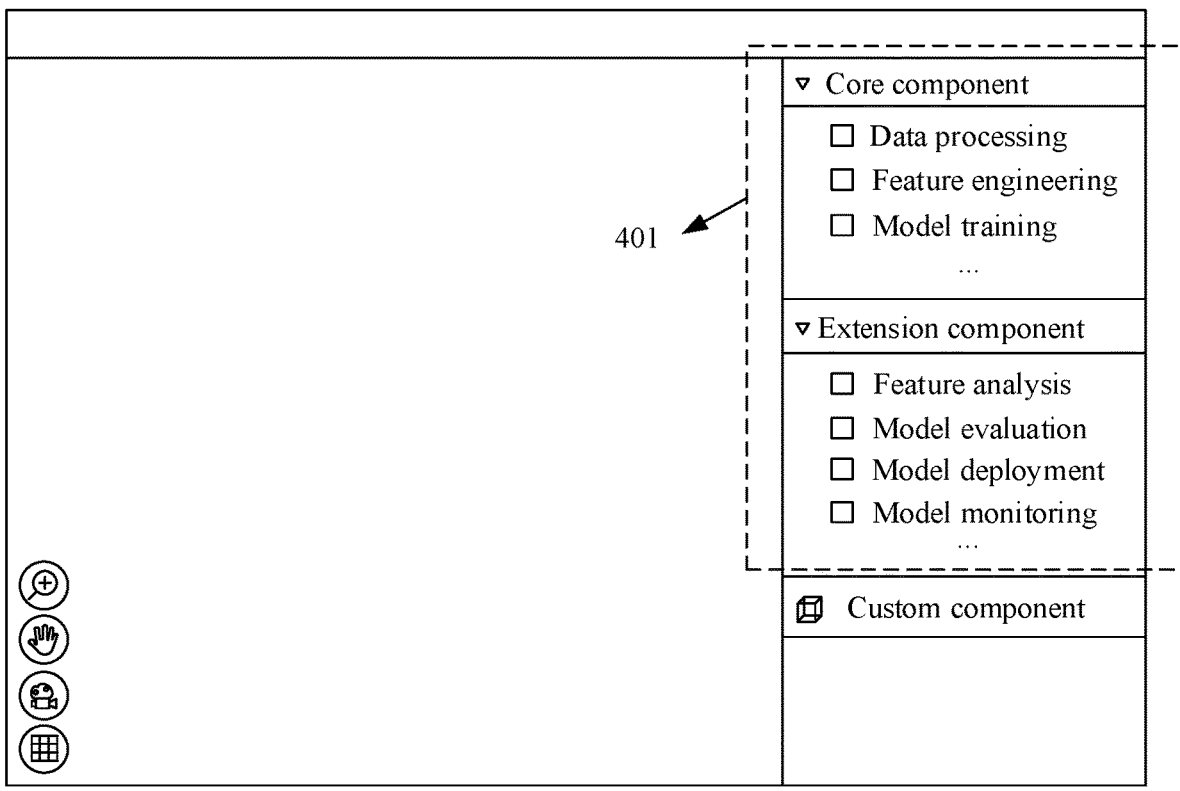
FIG. 4 to FIG. 6 are interface diagrams of a target component according to an embodiment of the present disclosure.
Figure 5:
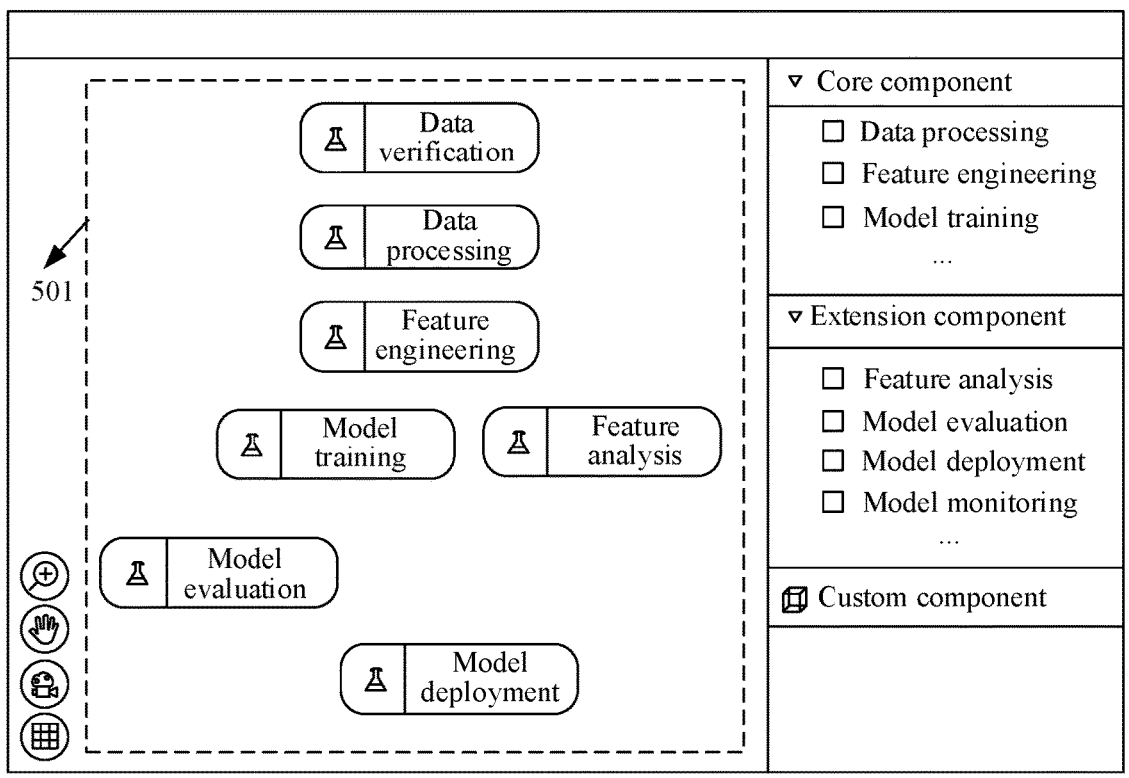

For example, as shown in FIG. 4, a candidate component 401 used for constructing a machine learning model is displayed in a human-machine interaction interface, for example, a data processing component, a feature engineering component, a model training component, a feature analysis component, a model evaluation component, and a model monitoring component. As shown in FIG. 5, a user selects a target component from displayed candidate components by using a selection operation, and displays a target component 501 in the human-machine interaction interface, for example, a data verification component, a data processing component, a feature engineering component, a model training component, a feature analysis component, and a model evaluation component. The selection operation is not limited in this embodiment of the present disclosure. For example, the selection operation may be a touch operation, such as a tap, a long press, or a drag operation. For another example, a non-touch operation may be performed, for example, a voice input operation.

Program logic that implements a corresponding function is encapsulated in the component. For example, the data verification component is encapsulated with a logic program used for performing a data verification task. The data check task includes detecting whether a data format is correct, and the data processing component is encapsulated with a logic program used for performing a data processing task. The data processing task includes data preprocessing, for example, data filtering. The feature analysis component is encapsulated with a logic program for performing a feature analysis task, where feature analysis is one of pattern recognition theories. It is claimed that a pattern or a thing is composed of several elements or features that are combined according to a certain relationship. Therefore, to identify a thing or a pattern, a basic attribute or a basic feature of the thing or the pattern may be analyzed. The model evaluation component is used for evaluating accuracy of the machine learning model and efficiency of the machine learning model.

In some embodiments, after the plurality of target components are determined, the plurality of target components are displayed on a human-machine interaction interface; and in response to a connection operation for the plurality of target components, a connection relationship between the target components corresponding to the connection operation is constructed. In this embodiment of the present disclosure, a data flow track may be set by using a connection operation, so as to reduce difficulty in constructing a machine learning model and improve human-machine interaction efficiency.

Figure 6:
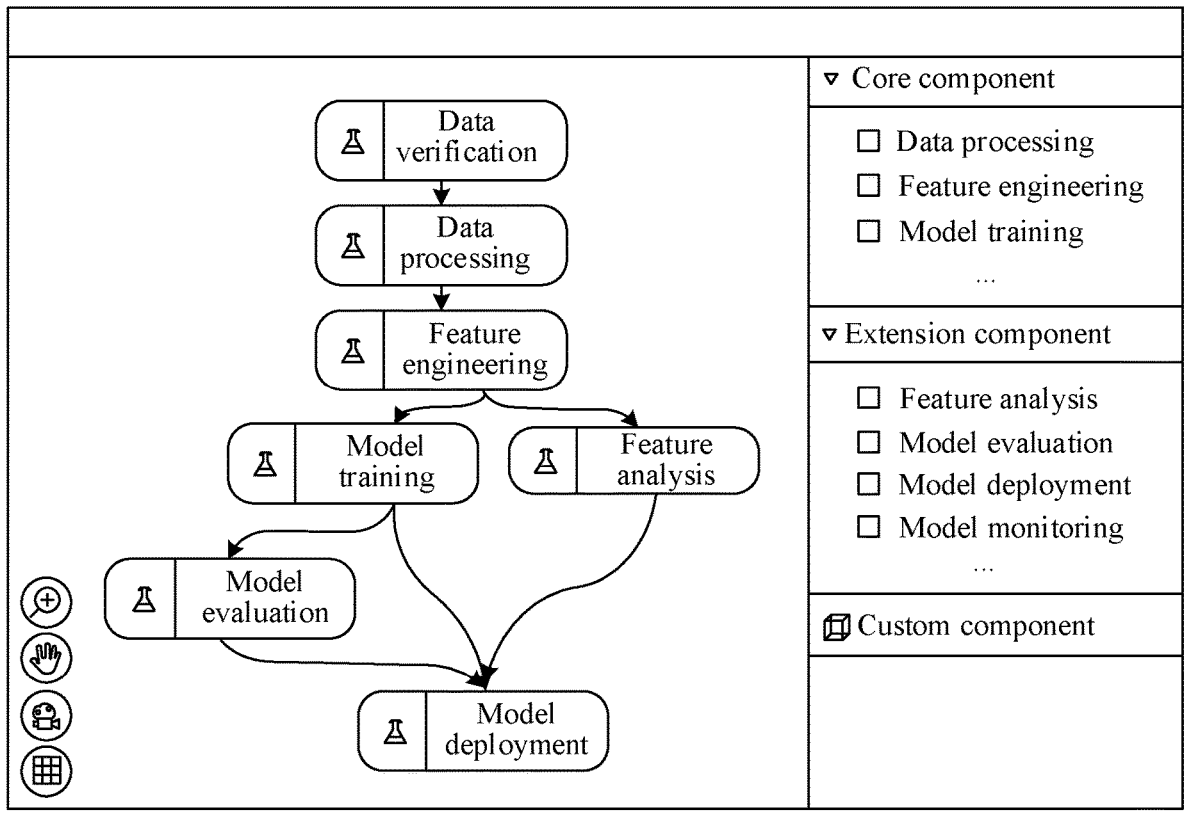

For example, after the target components shown in FIG. 5 are displayed in the human-machine interaction interface, the user connects the target components to each other by using a connection operation, so as to construct a directed connection relationship (that is, a directed line segment or a connection line with an arrow) between the target components, and displays, in the human-machine interaction interface, the directed connection relationship, that is, the connection line with an arrow, between the target components shown in FIG. 6, so as to indicate a data flow direction between the target components. For example, output data of the data verification component flows to the data processing component (that is, the data verification component is an upstream component of the data processing component), and output data of the data processing component flows to the feature engineering component (that is, the data processing component is an upstream component of the feature engineering component).

In step 102, perform standardization processing on input data and output data of the plurality of target components to obtain standardized components respectively corresponding to the plurality of target components.

For example, standardizing the input data and the output data of the target components by standardizing input/output protocols of the target components is equivalent to implementing a unified data input/output protocol, so as to implement normal movement of data flows between the target components, so as to subsequently perform a complete machine learning task, determine a data dimension in a configuration parameter as a data dimension of input data of the target component, determine a data type in the configuration parameter as a data type of the input data of the target component, and save, as standardized metadata, the data dimension, a data type, and the like as a data attribute.

Figure 3B:
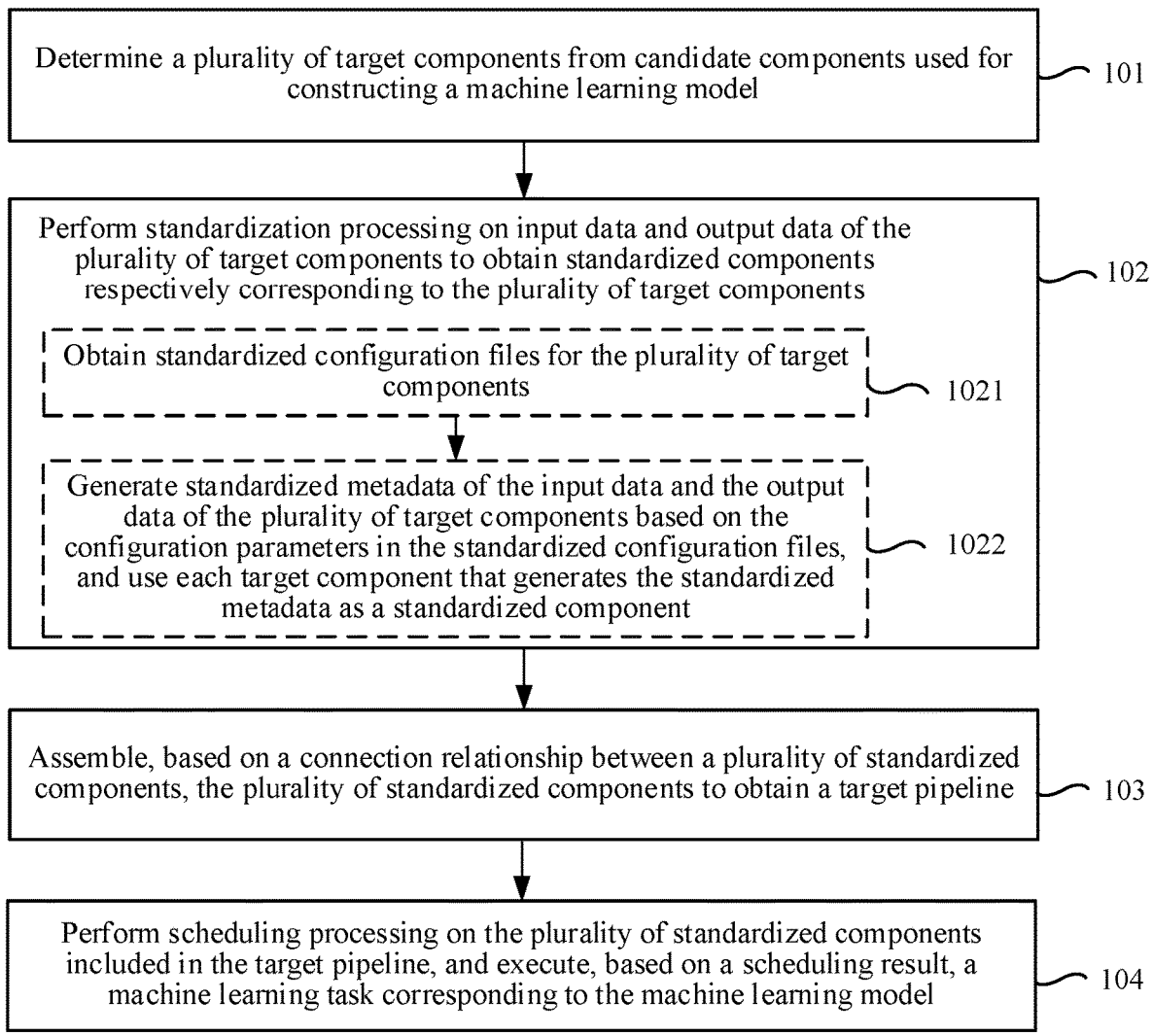

Referring to FIG. 3B, FIG. 3B is a schematic flowchart of a pipeline-based machine learning method according to an embodiment of the present disclosure. Based on FIG. 3A, step 102 shown in FIG. 3B may be implemented by step 1021 or step 1022, which is specifically described below.

In step 1021, obtain standardized configuration files for the plurality of target components; the standardized configuration files including configuration parameters of the input data and the output data of the plurality of target components.

The configuration parameter includes a data type, a data dimension, a data storage location, and the like. For example, input data is configured as a vector, and output data is configured as a matrix.

In step 1022, generate standardized metadata of the input data and the output data of the plurality of target components based on the configuration parameters in the standardized configuration files, and use each target component that generates the standardized metadata as a standardized component.

As an example, the data dimension in the configuration parameter is a 5*10 dimension, and the data storage location in the configuration parameter is an address of a known device. The data storage location and the data dimension (one of data attributes) are used as standardized metadata. The standardized metadata includes the data attribute and the data storage location. Subsequently, input data may be obtained by searching the data storage location, and the input data may be processed by using the target component after the input data is adjusted to the data dimension.

In this embodiment of the present disclosure, input data and output data of each target component are configured in a standardized manner, so as to facilitate normal data flow in a subsequent machine learning model.

For example, after the target components used for constructing the machine learning model are determined, because input and output of the target components have not been standardized, for a target component, input and output of the target component may be preconfigured, a configuration result for the input and output is used as a standardized configuration file for the target component, and the standardized configuration file is saved.

Subsequently, when a target component needs to be standardized, a standardized configuration file for the target component is obtained, and standardized metadata of specific input data and specific output data of the plurality of target components are generated based on configuration parameters for input and output in the standardized configuration file. Input to each target component includes at least one piece of input data, and output of each target component includes at least one piece of output data, that is, the target component may be a multiple-input multiple-output component.

As an example, a configuration parameter corresponding to input and output is obtained from a standardized configuration file, for example, the configuration parameter includes data attribute information such as a data dimension and a data storage location. The data dimension in the standardized file is a 1*10 dimension, the data storage location is an address of a known device, and the data dimension of 1*10 and the address of the known device are used as standardized metadata of input data and output data of a target component. Therefore, when the target component is subsequently invoked, the storage address of the input data may be obtained by searching for the standardized metadata, the input data is read by using the storage address, the input data is adjusted to the 1*10 dimension, and corresponding scheduling processing of the target component is performed.

The standardized metadata may be classified according to an application requirement. For example, six types of standardized metadata are designed in this embodiment of the present disclosure, as follows: 1) Data (Dataset), used for transmitting data generated by a component, where a data structure may be a data frame of Spark, or may be TFRecord of TensorFlow; 2) Transform graph, used for showing information association and a data flow direction between feature engineering components, where a plurality of components finally generate one transform graph for generating a modeling feature during model inference; 3) Transformer data: may be data of a model, for example, data of a classification model, a regression model, or a clustering model, where model data is generated and outputted by using a transformer component of a core. 4) Model evaluation result (Evaluation), for example, accuracy evaluation is performed on a task execution result of a machine learning model; 5) Monitoring data (Blessing), derived from a monitoring component, which may be model inference monitoring, or may be metadata monitoring, a label indicating whether monitoring succeeds. 6) Analysis report (Analysis), for example, a feature analysis report or an inference result analysis report.

Figure 13:
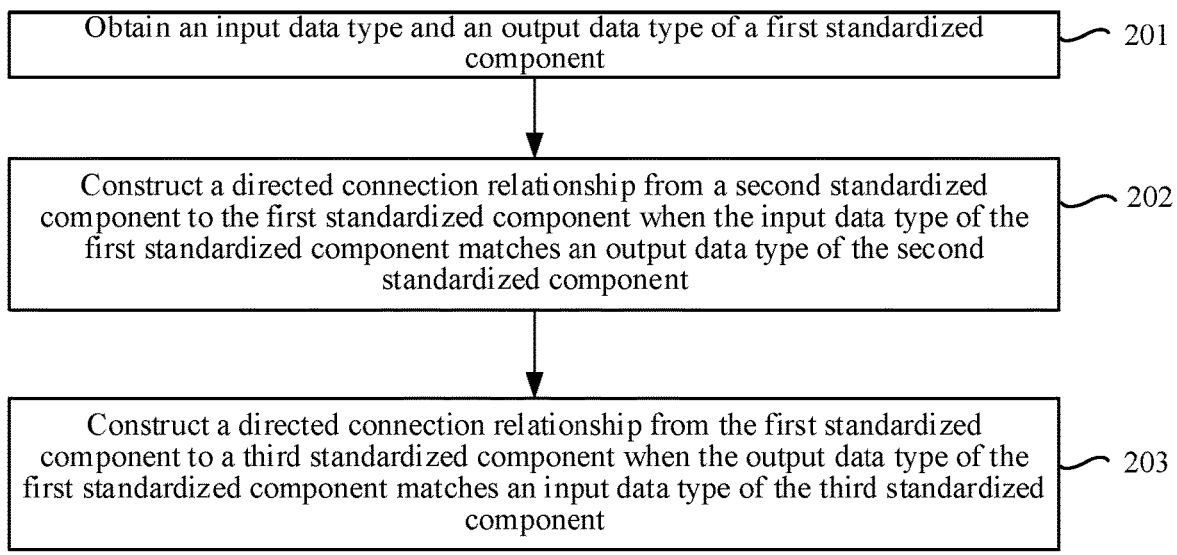
FIG. 13 is a schematic flowchart of a pipeline-based machine learning method according to an embodiment of the present disclosure.

In some embodiments, referring to FIG. 13, step 201 to step 203 show processing performed on any standardized component after standardized processing is performed on input data and output data of a plurality of target components. Details are described below.

In step 201, obtain an input data type and an output data type of the standardized component (also referred as a first standardized component).

In step 202, construct a directed connection relationship from a first another standardized component (also referred as a second standardized component) to the first standardized component when the input data type of the first standardized component matches an output data type of the second standardized component.

The first another standardized component is described by using an example. After the input data and the output data of the plurality of target components are standardized, it is assumed that there are 10 standardized components. For any standardized component A, the first another standardized component is a standardized component that meets the following conditions in the other nine standardized components: An output data type of a standardized component matches an input data type of the standardized component A.

In step 203, construct a directed connection relationship from the first standardized component to a second another standardized component (also referred as a third standardized component) when the output data type of the first standardized component matches an input data type of the third standardized component.

The second another standardized component is described by using an example. After the input data and the output data of the plurality of target components are standardized, it is assumed that there are 10 standardized components. For any standardized component A, the second another standardized component is a standardized component that meets the following conditions in the other nine standardized components: An output data type of a standardized component matches an input data type of the standardized component A.

In this embodiment of the present disclosure, a directed connection relationship may be automatically determined in a manner of data type matching, thereby increasing a speed of constructing a machine learning model.

As an example in step 201 to step 203, after standardization processing is performed on the input data and the output data of the plurality of target components, when an input data type of standardized component matches the output data type of the first another standardized component, that is, when the data types are the same, a directed connection relationship between the first another standardized component and the standardized component is constructed, that is, output data of the first another standardized component flows to the standardized component. When an output data type of a standardized component matches the input data type of the second another standardized component, a directed connection relationship between the standardized component and the second another standardized component is constructed, that is, output data of the standardized component flows to the second another standardized component.

As shown in FIG. 6, when an input data type of the data processing component matches an output data type of the data verification component, a directed connection relationship between the data verification component and the data processing component is constructed. When an output data type of the data processing component matches an input data type of the feature engineering component, a directed connection relationship between the data processing component and the feature engineering component is constructed.

Still referring to FIG. 3A, in step 103, assemble, based on a connection relationship between a plurality of standardized components, the plurality of standardized components into a pipeline corresponding to the machine learning model.

For example, after the directed connection relationship between the plurality of standardized components is obtained, the plurality of standardized components are assembled into a pipeline corresponding to the machine learning model according to the directed connection relationship between the plurality of standardized components. As shown in FIG. 6, the pipeline includes a data flow direction. Therefore, by reusing the candidate components, not only efficiency of constructing the machine learning model is improved, but also utilization of the components is improved, and a waste of computer resources is reduced.

In step 104, perform scheduling processing on the plurality of standardized components included in the pipeline, and execute, based on a scheduling result, a machine learning task corresponding to the machine learning model.

For example, after the pipeline is formed through assembly, scheduling processing is performed on the plurality of standardized components included in the pipeline based on a connection relationship between the plurality of standardized components included in the pipeline, until each standardized component in the pipeline completes a scheduling task, that is, a machine learning task corresponding to the machine learning model is executed, for example, a model training task, an information recommendation task, or an image recognition task.

In some embodiments, the standardized component includes a core component and an extension component, the core component is a general-purpose component used for constructing the machine learning model, and the extension component is a functional component configured to extend the machine learning model; and The performing scheduling processing on the plurality of standardized components included in the pipeline includes: invoking, by using an executor in a component development tool, execution logic of the core component to obtain a scheduling result of the core component; and invoking, by the executor in the component development tool, execution logic of the extension component based on the scheduling result of the core component, to obtain a scheduling result of the extension component.

For example, the standardized components include two types of components: a core component and an extension component. During component standardization in this embodiment of the present disclosure, components in a pipeline may be divided into a core component (that is, a core module) and an extension component (that is, an extension module) from a large granularity to a small granularity. The core module includes a data preprocessing (data process) component and a transformer component. The transformer component is used for model training and model inference. The extension module includes a model monitoring component, a feature analysis component, and a model evaluation component. When a standardized component is scheduled, the execution logic of the core component is invoked by using the executor in the component development tool to obtain the scheduling result of the core component; and the execution logic of the extension component is invoked by using the executor in the component development tool with reference to the scheduling result of the core component, to obtain the scheduling result of the extension component, that is, in a scheduling process of the extension component, an output result of the core component needs to be combined, to implement an auxiliary function.

In some embodiments, the standardized component includes a custom component; component customization is performed based on an open standard component abstraction interface of the component development tool to obtain a custom component; the custom component is saved to the component development tool; and scheduling processing may be performed on the plurality of standardized components included in the pipeline by using the following technical solutions: invoking, by using an executor in a component development tool, execution logic of the custom component to obtain a scheduling result of the custom component. In this embodiment of the present disclosure, a component that meets a user requirement may be generated, so as to expand application space of a machine learning model.

As an example, this embodiment of the present disclosure further provides a function of customizing a component by a user. The component development tool opens the standard component abstraction interface to the user, performs component customization processing based on the standard component abstraction interface to obtain a custom component, and stores the custom component in the component development tool. When the user selects the custom component as a target component used for constructing a machine learning model, in a process of scheduling the component, the executor in the component development tool invokes the execution logic of the custom component to obtain a scheduling result of the custom component, so as to implement a function of the custom component, and the custom component is a new component developed by the user according to an application requirement.

As an example, the user needs to implement a feature enhancement function. Therefore, an implementation program corresponding to the feature enhancement function is encapsulated in a new component in a form of logical code by using the standard component abstraction interface, and the obtained new component is used as a custom component used for implementing the feature enhancement function.

In some embodiments, the performing scheduling processing on the plurality of standardized components included in the pipeline includes: performing the following processing by using the executor in the component development tool: performing scheduling processing on the first standardized component in the pipeline to obtain a scheduling result of the first standardized component; and performing scheduling processing on an (i+1)th standardized component based on a scheduling result of an ith standardized component according to a data flow from the ith standardized component to the (i+1)th standardized component in the pipeline, to obtain a scheduling result of the (i+1)th standardized component; i being an incremental natural number, a value range being $1<i<M$, M being a quantity of the standardized components, and M being a positive integer greater than 2. Component scheduling may be completed in sequence by using the iterative processing manner provided in this embodiment of the present disclosure, to effectively implement a modeling task.

As shown in FIG. 6, scheduling processing is performed on the data verification component (that is, the first standardized component) in the pipeline, to obtain a scheduling result of the data verification component. Scheduling processing is performed on the data processing component based on the scheduling result of the data verification component according to a data flow direction from the data verification component to the data processing component, to obtain a scheduling result of the data processing component, and the foregoing process is iterated until scheduling of a model deployment component is completed, so as to implement a modeling task.

In some embodiments, the performing scheduling processing on an (i+1)th standardized component based on a scheduling result of an ith standardized component, to obtain a scheduling result of the (i+1)th standardized component includes: parsing the scheduling result of the ith standardized component to obtain standardized metadata corresponding to the ith standardized component; performing scheduling task status query processing on the (i+1)th standardized component to obtain a task execution status of the (i+1)th standardized component; and performing, when the task execution status of the (i+1)th standardized component indicates that the (i+1)th standardized component needs to execute a scheduling task, scheduling processing on the (i+1)th standardized component based on the standardized metadata corresponding to the ith standardized component, to obtain the scheduling result of the (i+1)th standardized component.

For example, parsing processing is performed on the metadata (corresponding to the scheduling result) of the ith standardized component, to obtain a data attribute (that is, a data attribute corresponding to the ith standardized component) of output data of the ith standardized component. Scheduling task status management is performed on the ith standardized component to obtain the task execution status of the (i+1)th standardized component. When the task execution status of the (i+1)th standardized component indicates that the (i+1)th standardized component needs to execute a scheduling task, scheduling processing is performed on the (i+1)th standardized component based on the scheduling result of the ith standardized component, to obtain the scheduling result of the (i+1)th standardized component, so as to implement smooth movement of a data flow. Therefore, scheduling task status management is performed on the component, and precise management of component scheduling is implemented.

In some embodiments, before scheduling processing is performed on the (i+1)th standardized component based on the scheduling result of the ith standardized component, the scheduling result of the ith standardized component is obtained from a meta database; and after scheduling processing is performed on the (i+1)th standardized component based on the scheduling result of the ith standardized component, the scheduling result of the (i+1)th standardized component is saved in the meta database.

For example, the scheduling result (that is, corresponding metadata) of the ith standardized component is obtained from the meta database, scheduling processing is performed on the (i+1)th standardized component based on the scheduling result of the ith standardized component to obtain the scheduling result of the (i+1)th standardized component, and the scheduling result of the (i+1)th standardized component is saved in the meta database, so that output data of the component is uniformly managed by using the meta database, thereby avoiding data loss.

In some embodiments, the pipeline includes an offline inference pipeline for the machine learning model that is offline and an online inference pipeline for the machine learning model that is online, and the standardized component includes a monitoring component, an offline component for the offline inference pipeline, and an online component for the online inference pipeline; scheduling processing may be performed on the plurality of standardized components included in the pipeline by using the following technical solutions: performing scheduling processing on the offline component to obtain an offline scheduling result of the machine learning model that is offline; and performing scheduling processing on the online component to obtain an online scheduling result of the machine learning model that is online; and executing, based on a scheduling result, a machine learning task corresponding to the machine learning model, which may be implemented by using the following technical solution: performing, by using the monitoring component, monitoring processing on the offline scheduling result and the online scheduling result, and executing, based on a monitoring result, the machine learning task corresponding to the machine learning model.

For example, for offline inference, specific offline components involved in an offline inference pipeline process include a data processing component, a feature engineering component, a model inference component, and an inference monitoring component. The model inference component pulls a trained model to load for use, and obtains an offline scheduling result of a machine learning model that is offline after offline inference pipeline scheduling is completed. For online inference, online components involved in an online inference pipeline include a data processing component, a feature engineering component, an output stock-out component (for online inference), and a model online real-time inference component. After online inference pipeline scheduling is completed, an online scheduling result of a machine learning model that is online is obtained. Finally, monitoring processing is performed on the offline scheduling result and the online scheduling result by using the monitoring component, and a machine learning task corresponding to the machine learning model is executed based on the monitoring result. For example, when it is determined, by means of monitoring, that the offline scheduling result and the online scheduling result are consistent, it indicates that the online inference pipeline is safe, and the machine learning task corresponding to the machine learning model can be executed based on the online inference pipeline. When it is determined by means of monitoring that the offline scheduling result and the online scheduling result are inconsistent, it indicates that the online inference pipeline is unsafe, and the machine learning model needs to be re-adjusted to ensure consistency between the offline model (that is, the machine learning model that is offline) and the online model (that is, the machine learning model that is online).

For example, for an image recognition scenario, a plurality of target components such as a data processing component, a feature engineering component, and an image recognition component are determined from candidate components used for constructing an image recognition model; input data and output data of the plurality of target components are standardized; the plurality of standardized components are assembled into an image recognition pipeline based on an obtained connection relationship between the standardized components; scheduling processing is performed on the plurality of standardized components included in the image recognition pipeline; and an image recognition task corresponding to the image recognition model is executed based on a scheduling result.

For example, for a text recommendation scenario, a plurality of target components, such as a data processing component, a feature engineering component, and a text recommendation component, are determined from candidate components used for constructing a text recommendation model; input data and output data of the plurality of target components are standardized; the plurality of standardized components are assembled into a text recommendation pipeline based on an obtained connection relationship between the standardized components; scheduling processing is performed on the plurality of standardized components included in the text recommendation pipeline; and a text recommendation task corresponding to the text recommendation model is executed based on a scheduling result.

The following describes an exemplary application of the embodiments of the present disclosure in an actual application scenario.

With the development of artificial intelligence technologies, various machine learning platforms emerge, for example, symbolic mathematical systems (for example, TensorFlow (TF) and TensorFlow Extended (TFX)), MLFlow, Tesla, unified scheduling systems (US, Unified Scheduler), Dflow, PAI, SageMaker, and data analysis tools (for example, SAS and Statistical Product and Service Solutions (SPSS)) that can be used for deep learning modeling. Among them, a use threshold of TFX is high, and a pipeline is constructed in a form of program. By controlling input and output standardized components, specific functions of sample production and feature engineering components are not implemented, and it is difficult to be compatible with a complex production environment. MLFlow focuses on model development and reproduction, such as model training, inference, and deployment, and is not conceptually based on a workflow. Tesla does not support data management, model instance management, and model deployment management. Unified Scheduler does not support data management, model instance management, and model deployment management. Modeling studying problems of Dflow are different, and it is difficult to adapt to a recommended-dual primary key mode. PAI/SageMaker is a universal machine learning platform similar to Tesla. SAS/SPSS is financial modeling software as a service (SaaS), and the system is closed.

Therefore, a service process of a machine learning platform in a related technology is not fixed, a pipeline needs to be repeatedly developed, labor costs are high, maintenance and iteration are difficult in a later period, construction of a machine learning pipeline that can be freely assembled and pluggable is not supported, and input and output of components are not standardized. Therefore, movement of the entire pipeline data flow cannot be completed. A universal interface of the custom component is not provided. There is no monitoring function, and consistency of an offline model and an online model cannot be ensured.

To resolve the foregoing problem, an embodiment of the present disclosure provides a machine learning platform based on free assembly of a data flow. Free assembly is performed by using a component in a pluggable form, so as to reduce configuration and optimize execution efficiency. The embodiment of the present disclosure can be applied to machine learning training in a plurality of service scenarios, and is used for implementing a service application of a model. Compared with that an original service process is not fixed and the pipeline is repeatedly developed, in this embodiment of the present disclosure, labor costs can be reduced, and later maintenance and iteration are facilitated.

Figure 7:
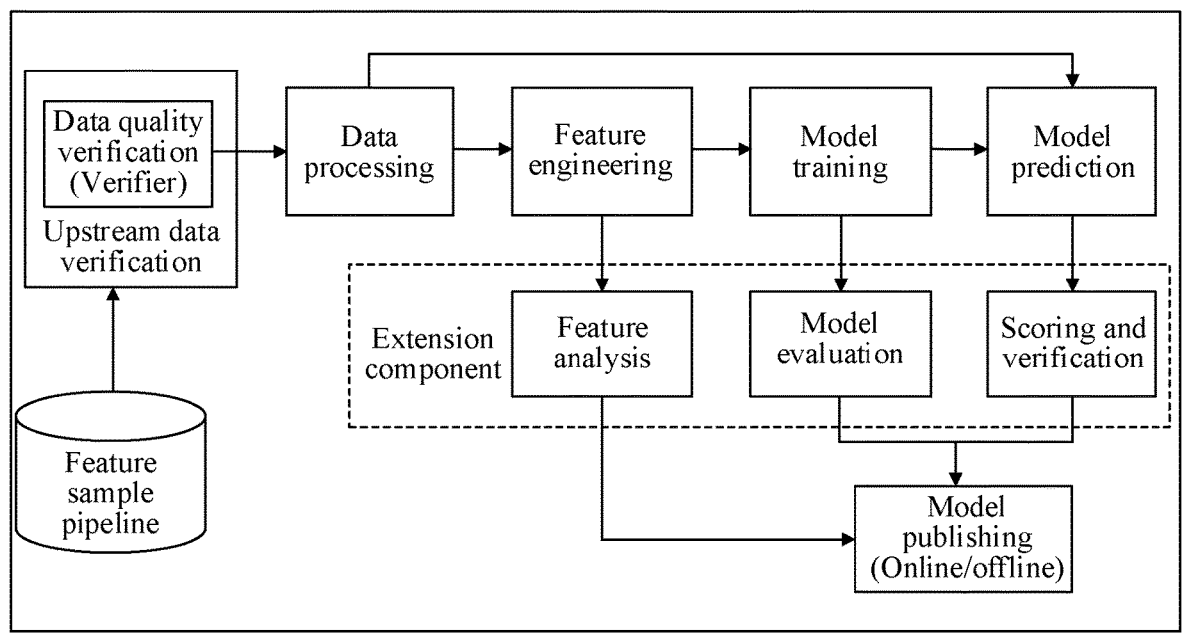
FIG. 7 is a schematic flowchart of a pipeline according to an embodiment of the present disclosure.

A process overview of a pipeline is shown in FIG. 7. The pipeline in this embodiment of the present disclosure includes two parts, and one part is each component in the pipeline, for example, a data processing component, a feature engineering component, a model training component, a model prediction component, and a model evaluation component. The other part is a data flow in the pipeline (that is, the connection line with an arrow in FIG. 4).

Figure 8:
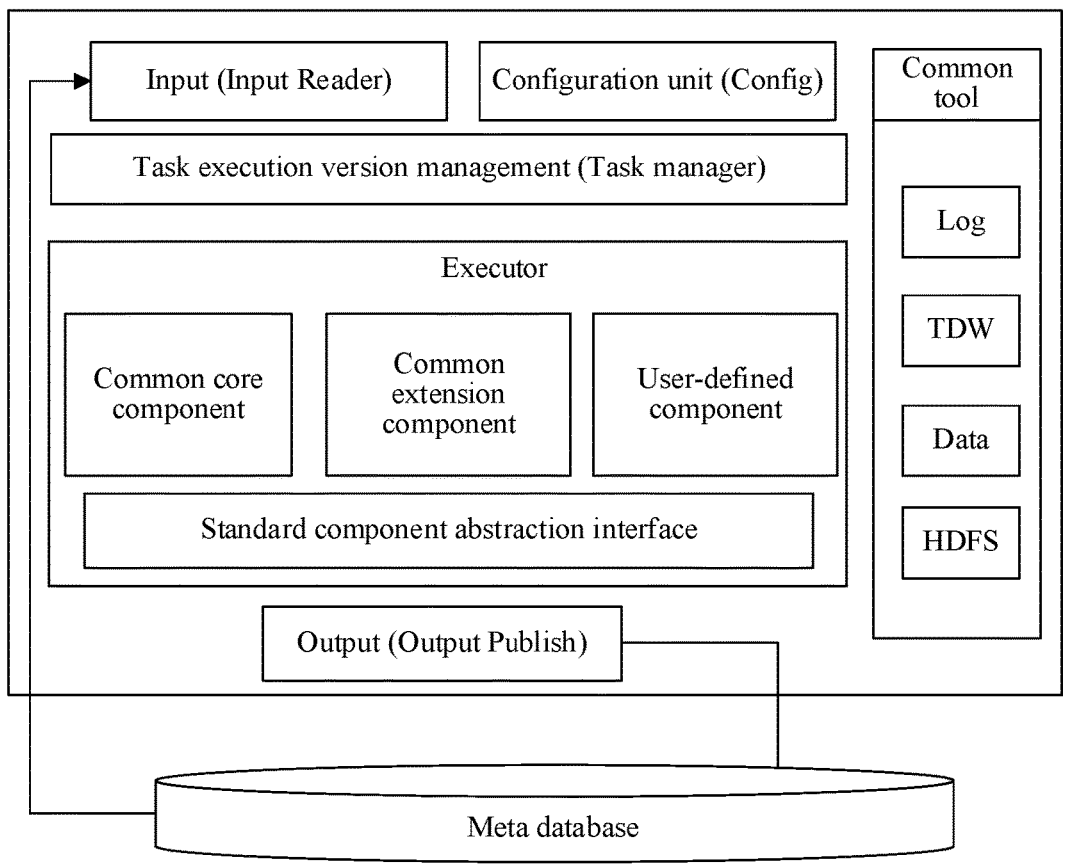
FIG. 8 is a development framework diagram of a component according to an embodiment of the present disclosure.

With reference to a component development framework shown in FIG. 8, the following specifically describes a component development process in a pipeline.

1. Each component may receive at least one piece of input data (standardized metadata) by using an input interface (input reader), and receive at least one piece of output data (standardized metadata) by using an output structure (output publish).

2. A configuration unit (Config) is a parameter parsing module of each component, and is configured to implement functions such as request, parsing, and checking.

3. A task execution management unit (Task Manager) is configured to implement status (completed or not and completion progress) management and version management of a component in a scheduling execution process.

4. An executor is a specific execution logic part of a component, and is configured to implement a component task and a logic function. For example, a machine learning platform provides a common core component, such as a data processing component, a feature engineering component, or a model training component. The machine learning platform provides a common extension component, such as a feature analysis component, a model evaluation component, or a scoring and checking component. A user can develop a custom component through a standard component abstraction interface (API).

5. Meta database: used for unified management of metadata (input data and output data).

6. A common tool can provide a user with a series of log, database, and file management tools.

Therefore, with reference to a component development process in the pipeline, this embodiment of the present disclosure can implement the following functions:

1) It can support a pluggable pipeline and free combination of components in the pipeline.

For example, an input/output data protocol is standardized, data abstraction is performed on the metadata, and unified management of the metadata is implemented by using a meta database. Through free assembly of components in the pipeline, a data flow is driven to run in computing components of different frameworks (for example, fast, generic computing engines designed for large-scale data processing (for example, spark), tree-type machine learning model frameworks (for example, xgboost), and TensorFlow) to schedule logic of an execution component.

2) It supports opening of some functions of the component development framework and user-defined uploading of code components, that is, custom components.

For example, after completing function development, a user can implement specific calculation logic of a component in the executor, and may obtain, by using a standard component abstraction interface (API), input data and output data of parameters and data that are parsed by the component development framework. The user may complete, by using standard abstract inheritance, abstraction of metadata between components in the pipeline. For example, output of a monitoring component may be abstracted into a piece of data whether to be monitored. After receiving the data, a downstream component (that is, a next component connected to the monitoring component) may determine whether to currently execute a component task or skip a component task. The user can also customize an interface protocol. The interface protocol is related information such as work content, input content, and return content of the standard component abstraction interface. It supports execution and deployment of custom components, for example, via Spark Scala, PySpark, and TensorFlow.

3) Deployment and monitoring capabilities (model inference is an actual application phase, and security of inference deployment will directly affect a production application).

For example, offline inference is basically implemented and deployed at an offline end, and stability and accuracy of a prediction result need to be monitored. In offline inference, components involved in a specific pipeline process include a data processing component, a feature engineering component, a model inference component, and an inference monitoring component. The model inference component pulls a trained model to load for use.

For example, real-time inference is implemented and deployed in different phases such as offline, online background, and data synchronization. Monitoring content includes: features (including offline features and real-time features) and the like. Components involved in the pipeline of the training part include a data processing component, a feature engineering component, a model training component, and a model online deployment component. Components involved in the real-time inference pipeline include a data processing component, a feature engineering component, an output stock-out component (for online inference), and a model online real-time inference component.

Figure 9:
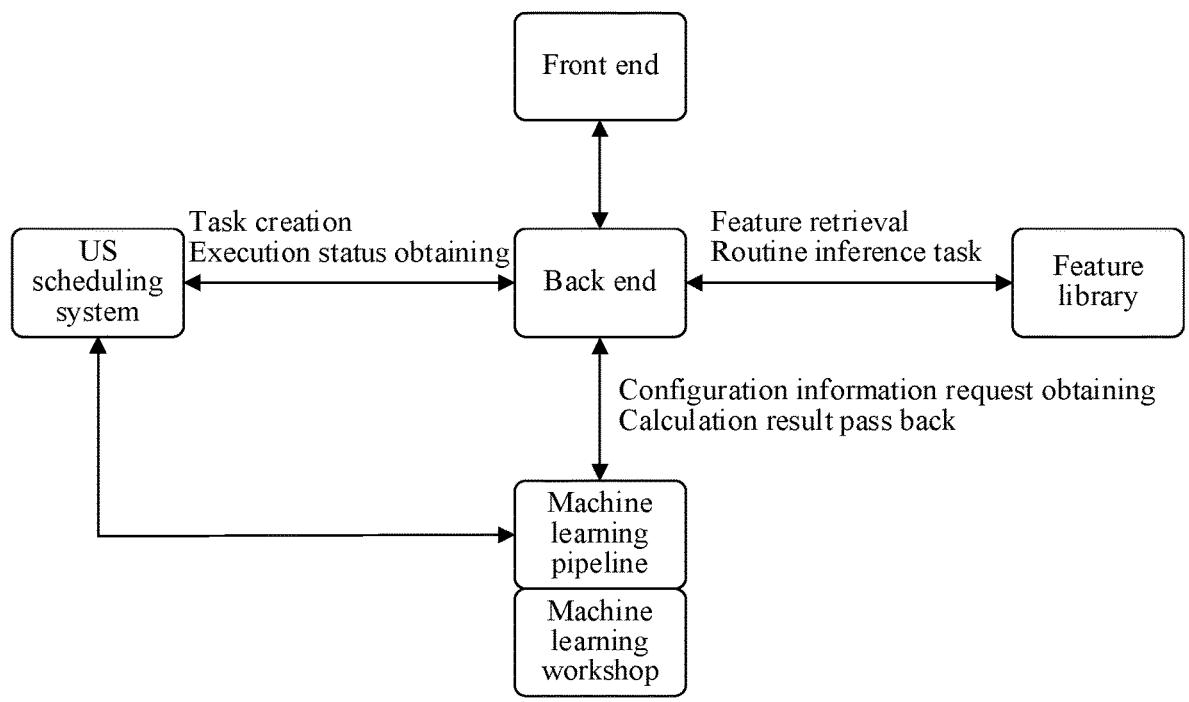
FIG. 9 is a diagram of a machine learning system according to an embodiment of the present disclosure.

The following system interaction description is performed with reference to a machine learning system shown in FIG. 9:

The machine learning system in FIG. 9 includes a front end, a back end, a feature library, a US scheduling system, a machine learning pipeline, and a machine learning workshop.

Figure 10:
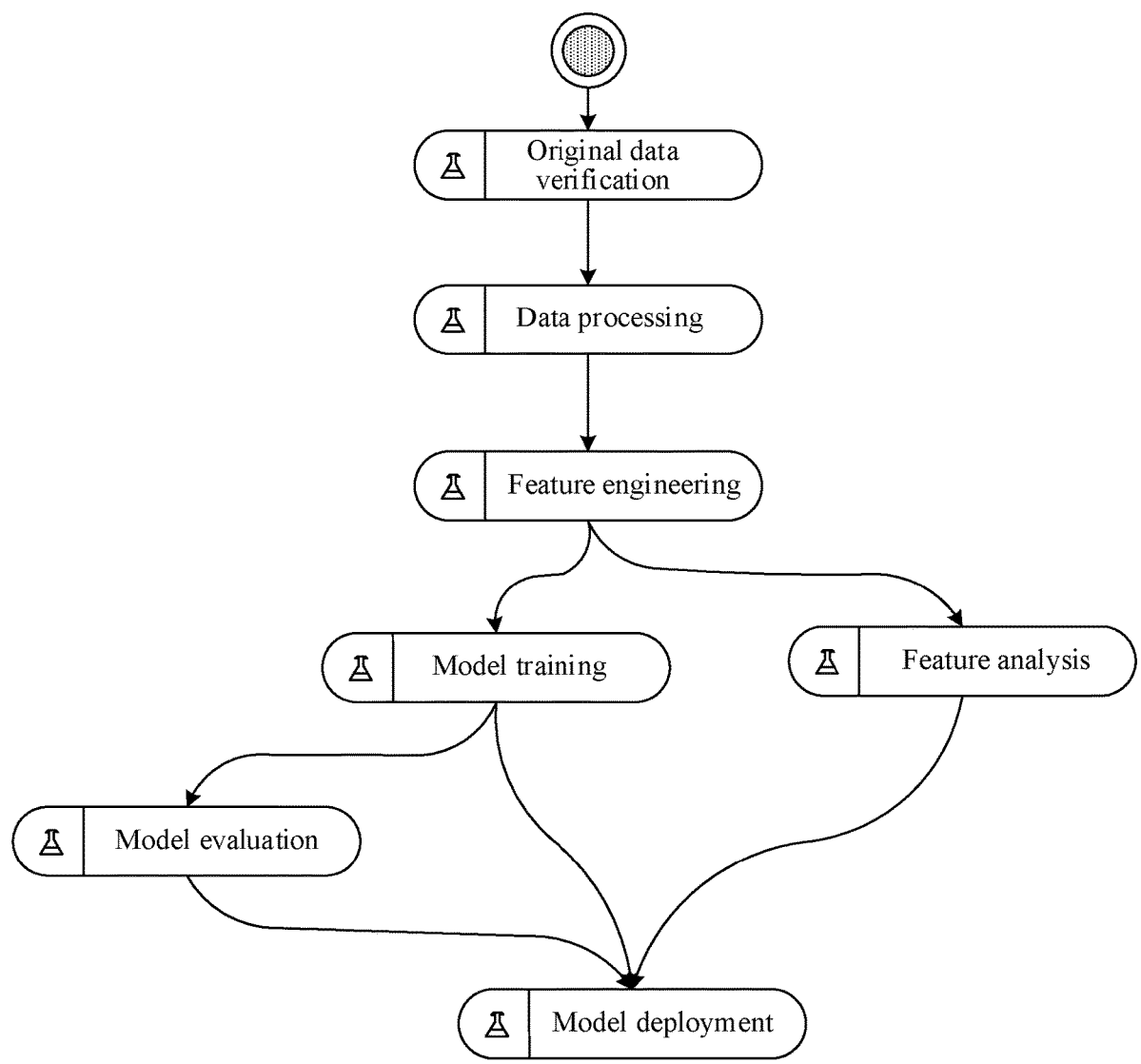
FIG. 10 is a schematic diagram of a pipeline according to an embodiment of the present disclosure.

As shown in FIG. 10, the front end displays each component used for modeling. A user pulls each component by dragging or the like, and performs assembly, so as to generate a pipeline. The pipeline is used for modeling, data processing, and the like. As shown in FIG. 9, the back end may store pipeline information, for example, component information, a component association relationship, and component metadata. The back end may schedule the pipeline to obtain scheduling information, a task completion status, and the like. As shown in FIG. 9, the feature library is used for managing and storing feature information required for modeling. As shown in FIG. 9, the US scheduling system may perform resource scheduling, and provide a model or a data processing environment. As shown in FIG. 9, a machine learning pipeline (ML-pipeline) is used for interconnecting the back end and driving a component calculation logic task. A machine learning workshop (ML-workshop) includes specific calculation logic of a component, and receives a calculation result during scheduling.

In this embodiment of the present disclosure, content in the pipeline of the machine learning platform is standardized, including component standardization and information standardization. The following specifically describes component standardization and information standardization.

1. Component standardization: Standard processes in the machine learning platform include sample preparation (training or prediction), feature engineering, feature filtering, model training, model deployment, data monitoring, inference monitoring, and the like.

When component standardization is performed, a component of the pipeline is divided into core modules and extension modules from a large granularity to a small granularity, where the core module includes a data preprocessing (data process) component and a transformer component, and the transformer is used for model training and model inference. The extension module includes a model monitoring component, a feature analysis component, and a model evaluation component.

Figure 11:
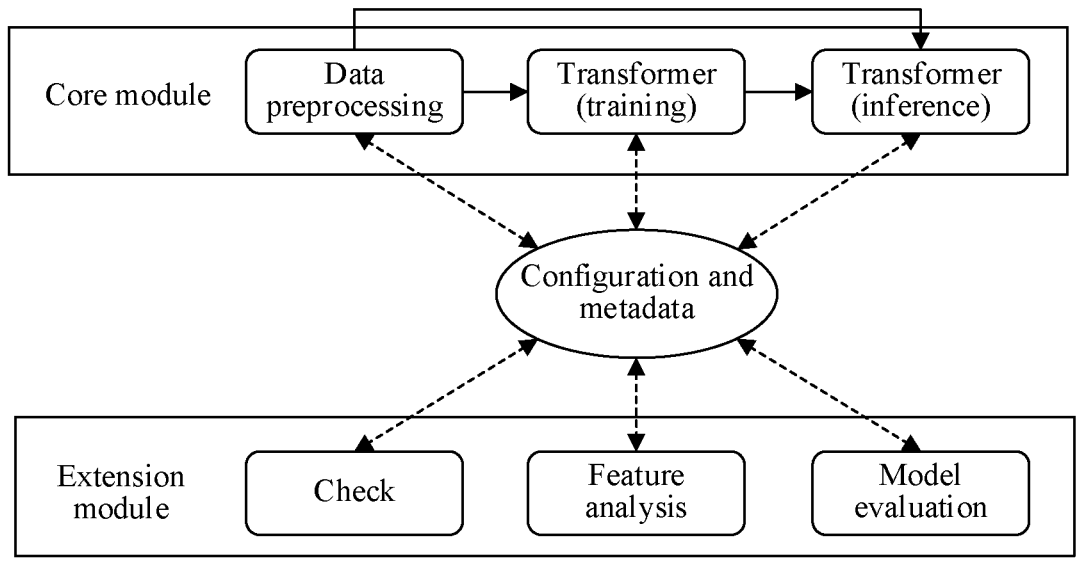
FIG. 11 is a schematic diagram of a component according to an embodiment of the present disclosure.

As shown in FIG. 11, components are independent of each other, and data flow movement between components is completed through configuration and metadata reading and storage. The components may be divided into three types according to functions and input/output, as shown in Table 1.

TABLE 1

| Types of components | | | |
|---|---|---|---|
| Type | Description | Input | Output |
| data process | Data read processing | Data (Dataset) | Dataset |
| Transformer | Data conversion (existing in a training phase) | Dataset | Dataset and transform graph |
| extension | Auxiliary module and output result report | Dataset | Report | generating a modeling feature during model inference; 3) Transformer data: may be essentially data of a model, for example, a classification model, a regression model, or a clustering model, where model data is generated and outputted by using a transformer component of a core. 4) Model evaluation result (Evaluation); 5) Monitoring data (Blessing), derived from a monitoring component, which may be model inference monitoring, or may be metadata monitoring, and indicates whether monitoring succeeds. 6) Analysis report (Analysis), for example, a feature analysis report or an inference result analysis report.

Through metadata standardization, input and output of components are managed uniformly, and movement of the pipeline is completed according to a standard data flow. In an execution process, corresponding metadata is generated for output of each component. The metadata stores an attribute and a data location of the data, and the data attribute includes a data type, model information, data used for modeling, analysis data, check data, an evaluation report, and the like. The metadata may be stored in a lightweight data exchange format (for example, Json), displayed at the front end, and is described in metadata shown in Table 2.

TABLE 2

| Metadata in a pipeline | | |
|---|---|---|
| Metadata | Type | Description |
| Dataset | Data | Includes a specific data type (such as DataFrame or TFRecord], a data storage address, and training test set information. |
| transform graph | Transform graph | Storage address, transformer ID, and execution graph |
| Transformer | Model | Model file and storage address |
| Evaluation | Model evaluation | Model evaluation indicator and storage address |
| Blessing | Verification license | Model license, data license (pass or not), and storage address |
| Analysis | Data analysis | Data analysis (including importance and a statistical value calculated in a column dimension), and storage address |

2. Information standardization: Component concatenation of the pipeline depends not only on task scheduling, but also on information transmission of upstream and downstream components. Therefore, information needs to be standardized, and data flow movement is completed through configuration and metadata reading and storage.

Figure 14:
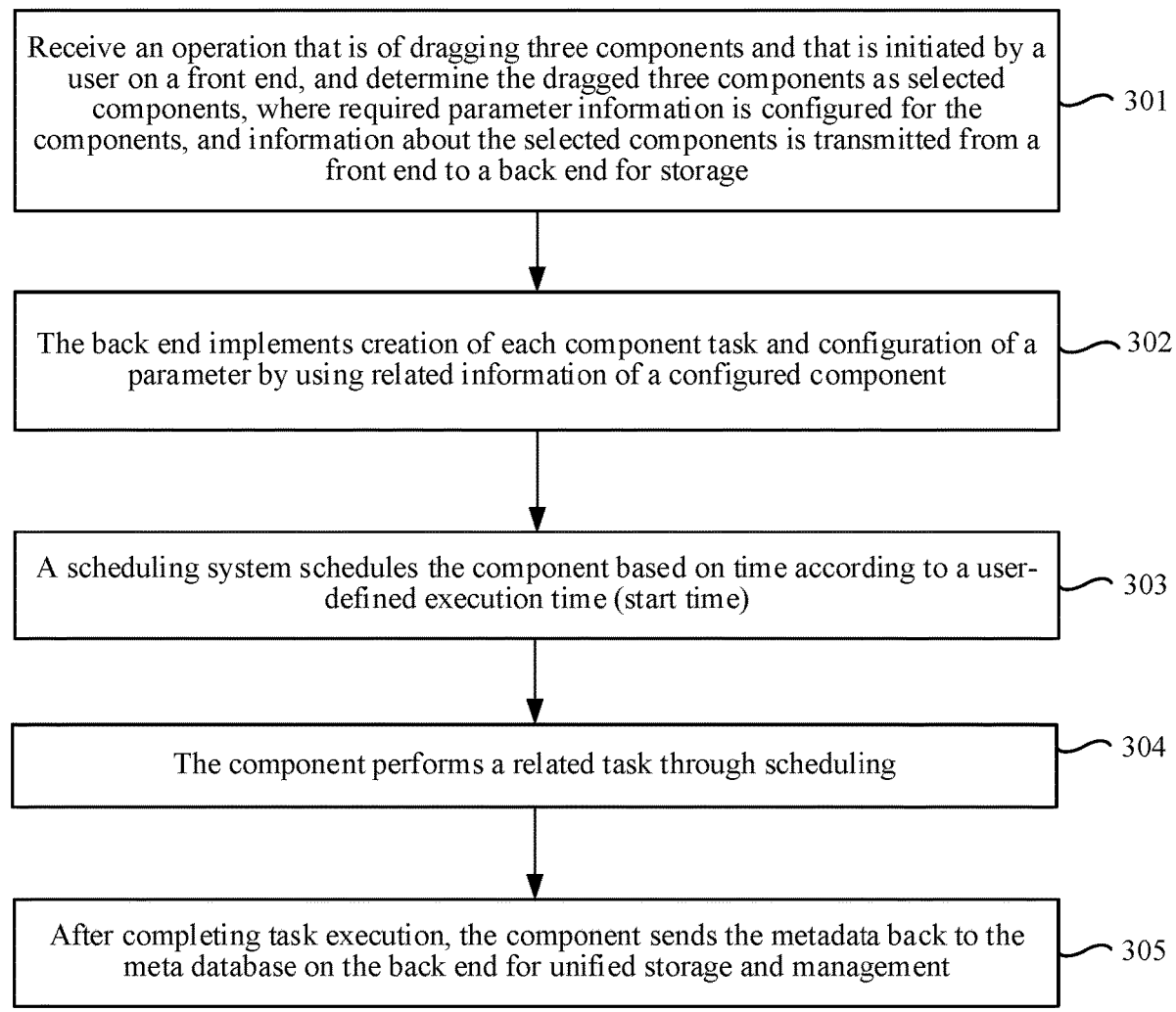
FIG. 14 is a schematic flowchart of a pipeline-based machine learning method according to an embodiment of the present disclosure.

A total of six types of metadata are designed in this embodiment of the present disclosure, as follows: 1) Data (Dataset), used for transmitting data generated by a component, where an intrinsic data structure may be a data frame of Spark, or may be TFRecord of TensorFlow; 2) Transform graph, used for transferring and associating information between feature engineering components, where a plurality of components finally generate one transform graph for Referring to FIG. 14, an example in which a pipeline includes three components: data processing, feature engineering, and model training is used. A modeling process is shown in step 301 to step 304. This is described in detail below.

In step 301, receive an operation that is of dragging three components and that is initiated by a user on a front end, and determine the dragged three components as selected components. In addition to dragging, the components may be selected in another form, required parameter information is configured for the components, and information about the selected components is transmitted from the front end to a back end for storage.

In step 302, the back end implements creation of each component task and configuration of a parameter by using related information of a configured component.

In step 303, a scheduling system schedules the component based on time according to a user-defined execution time (start time).

In step 304, the component performs a related task through scheduling.

First, a current component parses a parameter and upstream data (input), and the current component obtains and parses the parameter by using a request of an interface, and parses metadata (obtained from a meta database) inputted by an upstream component to obtain data. Second, through task status management, an execution status and version of a task of the current component are determined, so as to determine whether a task needs to be executed, a task needs to be skipped, a task needs to be continued, and the like. Then, specific execution logic of the component is executed by using an executor. Finally, an output result (metadata) corresponding to the current component is generated, and the metadata is outputted.

In step 305, after completing task execution, the component sends the metadata back to the meta database on the back end for unified storage and management.

In conclusion, in this embodiment of the present disclosure, the machine learning platform constructed by relying on the frameworks such as spark and TensorFlow can greatly reduce repetitive pipeline research and development, flexibly reuse components, standardize an entire modeling process, improve modeling efficiency and modeling quality, and facilitate viewing, maintenance, and management of the model.

So far, an exemplary application and implementation of the server provided in this embodiment of the present disclosure have been described with reference to the pipeline-based machine learning method provided in the embodiment of the present disclosure. An embodiment of the present disclosure further provides a pipeline-based machine learning apparatus. In actual application, functional modules in the pipeline-based machine learning apparatus may be cooperatively implemented by a hardware resource of an electronic device (for example, a terminal device, a server, or a server cluster), such as a computing resource such as a processor, a communication resource (for example, used for supporting implementation of communication in various manners such as an optical cable and cellular), and a memory. FIG. 2 shows a pipeline-based machine learning apparatus 555 stored in a memory 550, which may be software in a form of a program, a plug-in, or the like, for example, implementations of software modules designed by using programming languages such as C/C++ and Java, application software designed by using programming languages such as C/C++ and Java, or dedicated software modules, application programming interfaces, plug-ins, cloud services, and the like in a large software system. Different implementations are described by using examples in the following.

The pipeline-based machine learning apparatus 555 includes a series of modules, including a determining module 5551, a standardization module 5552, an assembly module 5553, a scheduling module 5554, and a custom module 5555. The following continues to describe that each module in the apparatus 555 for constructing a recommendation model provided in this embodiment of the present disclosure cooperates to implement a machine learning solution.

The determining module 5551 is configured to determine a plurality of target components from candidate components used for constructing a machine learning model; the standardization module 5552 is configured to perform standardization processing on input data and output data of the plurality of target components to obtain standardized components respectively corresponding to the plurality of target components; the assembly module 5553 is configured to assemble, based on a connection relationship between a plurality of standardized components, the plurality of standardized components to obtain a pipeline corresponding to the machine learning model; and the scheduling module 5554 is configured to perform scheduling processing on the plurality of standardized components included in the pipeline, and execute, based on a scheduling result, a machine learning task corresponding to the machine learning model.

In some embodiments, the standardization module 5552 is further configured to obtain standardized configuration files for the plurality of target components; the standardized configuration files including configuration parameters of the input data and the output data of the plurality of target components; generate standardized metadata of the input data and the output data of the plurality of target components based on the configuration parameters in the standardized configuration files; the standardized metadata including a data attribute and a data storage location; and use each of the target components that generate the standardized metadata as the standardized component.

In some embodiments, the standardized component includes a core component and an extension component, the core component is a general-purpose component used for constructing the machine learning model, and the extension component is a functional component used for extending the machine learning model; and the scheduling module 5554 is further configured to invoke execution logic of the core component to obtain a scheduling result of the core component; and invoke execution logic of the extension component with reference to the scheduling result of the core component, to obtain a scheduling result of the extension component.

In some embodiments, the standardized component includes a custom component; the apparatus further includes: the user-defined module 5555, configured to perform component customization processing to obtain the custom component; and save the custom component; and the scheduling module 5554 is further configured to invoke execution logic of the custom component to obtain a scheduling result of the custom component.

In some embodiments, the scheduling module 5554 is further configured to perform scheduling processing on the first standardized component in the pipeline to obtain a scheduling result of the first standardized component; and perform scheduling processing on an (i+1)th standardized component based on a scheduling result of an ith standardized component according to a data flow from the ith standardized component to the (i+1)th standardized component in the pipeline, to obtain a scheduling result of the (i+1)th standardized component; i being an incremental natural number, a value range being $1<i<M$, M being a quantity of the standardized components, and M being an integer greater than 2.

In some embodiments, the scheduling module 5554 is further configured to parse the scheduling result of the ith standardized component to obtain standardized metadata corresponding to the ith standardized component; perform scheduling task status query processing on the (i+1)th standardized component to obtain a task execution status of the (i+1)th standardized component; and perform, when the task execution status of the (i+1)th standardized component indicates that the (i+1)th standardized component needs to execute a scheduling task, scheduling processing on the (i+1)th standardized component based on the standardized metadata corresponding to the ith standardized component, to obtain the scheduling result of the (i+1)th standardized component.

In some embodiments, the scheduling module 5554 is further configured to obtain the scheduling result of the ith standardized component from a meta database; and save the scheduling result of the (i+1)th standardized component to the meta database.

In some embodiments, the pipeline includes an offline inference pipeline for the machine learning model that is offline and an online inference pipeline for the machine learning model that is online, and the standardized component includes a monitoring component, an offline component for the offline inference pipeline, and an online component for the online inference pipeline; and the scheduling module 5554 is further configured to perform scheduling processing on the offline component to obtain an offline scheduling result of the machine learning model that is offline; perform scheduling processing on the online component to obtain an online scheduling result of the machine learning model that is online; and perform, by using the monitoring component, monitoring processing on the offline scheduling result and the online scheduling result, and execute, based on a monitoring result, the machine learning task corresponding to the machine learning model.

In some embodiments, the determining module 5551 is further configured to display, in a human-machine interaction interface, a candidate component used for constructing a machine learning model; and use a selected candidate component as the target component in response to a selection operation for the candidate component.

In some embodiments, the determining module 5551 is further configured to display the plurality of target components in a human-machine interaction interface; and construct, in response to a connection operation for the plurality of target components, a connection relationship between the target components corresponding to the connection operation.

In some embodiments, the determining module 5551 is further configured to perform the following processing for any of the standardized components: obtaining an input data type and an output data type of the standardized component; constructing a directed connection relationship from a first another standardized component to the standardized component when the input data type of the standardized component matches an output data type of the first another standardized component; and constructing a directed connection relationship from the standardized component to a second another standardized component when the output data type of the standardized component matches an input data type of the second another standardized component.

The term module (and other similar terms such as submodule, unit, subunit, etc.) in this disclosure may refer to a software module, a hardware module, or a combination thereof A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In conclusion, in this embodiment of the present disclosure, a plurality of target components are determined from candidate components used for constructing a machine learning model, and the target components are standardized, so as to construct a pipeline for the machine learning model based on standardized components, so as to execute a machine learning task, thereby improving component utilization by reusing the candidate components, reducing a waste of computer resources, and improving efficiency of constructing the machine learning model.

An embodiment of the present disclosure provides a computer program product, where the computer program product stores a computer program or computer executable instructions, and the computer executable instructions are stored in a computer readable storage medium. A processor of an electronic device reads the computer executable instructions from the computer readable storage medium, and the processor executes the computer executable instructions, so that the electronic device performs the pipeline-based machine learning method in the embodiment of the present disclosure.

An embodiment of the present disclosure provides a computer readable storage medium that stores executable instructions. When the executable instructions are executed by a processor, the processor performs the pipeline-based machine learning method provided in the embodiment of the present disclosure, for example, the pipeline-based machine learning method shown in FIG. 3A and FIG. 3B.

In some embodiments, the computer readable storage medium may be a memory such as an FRAM, a ROM, a PROM, an EPROM, an EEPROM, a flash memory, a magnetic surface memory, an optical disc, or a CD-ROM; or may be any device that includes one or any combination of the foregoing memories.

In some embodiments, the executable instructions may be compiled in a form of a program, software, a software module, a script, or code, in any form of a programming language (including a compilation or interpretation language, or a declarative or procedural language), and may be deployed in any form, including being deployed as an independent program or as a module, component, subroutine, or another unit suitable for use in a computing environment.

As an example, the executable instructions may be but are not necessarily corresponding to a file in a file system, and may be stored in a part of a file that stores another program or data, for example, stored in one or more scripts in a Hypertext Markup Language (HTML) document, stored in a single file dedicated to a program under discussion, or stored in a plurality of synchronous files (for example, a file that stores one or more modules, subprograms, or code parts).

As an example, the executable instructions may be deployed to be executed on one computing device, or executed on a plurality of computing devices located at one location, or executed on a plurality of computing devices distributed at a plurality of locations and interconnected by using a communication network.

In conclusion, in this embodiment of the present disclosure, a plurality of target components are determined from candidate components used for constructing a machine learning model, and the target components are standardized, so as to construct a pipeline for the machine learning model based on standardized components, so as to execute a machine learning task, thereby improving component utilization by reusing the candidate components, reducing a waste of computer resources, and improving efficiency of constructing the machine learning model.

The foregoing descriptions are merely embodiments of the present disclosure and are not intended to limit the protection scope of the present disclosure. Any modification, equivalent replacement, or improvement made within the spirit and principle of the present disclosure shall fall within the protection scope of the present disclosure.

What is claimed is:

1. A pipeline-based machine learning method, performed by an electronic device and comprising:
    determining a plurality of target components from candidate components configured to construct a machine learning model;
    performing standardization processing on input data and output data of the plurality of target components to obtain a plurality of standardized components respectively corresponding to the plurality of target components;
    assembling, based on a connection relationship between the plurality of standardized components, the plurality of standardized components into a pipeline corresponding to the machine learning model;
    performing scheduling processing on the plurality of standardized components comprised in the pipeline, to obtain a scheduling result; and
    executing, based on the scheduling result, a machine learning task corresponding to the machine learning model.

2. The method according to claim 1, wherein the performing standardization processing on input data and output data of the plurality of target components to obtain standardized components respectively corresponding to the plurality of target components comprises:
    obtaining standardized configuration files for the plurality of target components;
    the standardized configuration files comprising configuration parameters of the input data and the output data of the plurality of target components;
    generating standardized metadata of the input data and the output data of the plurality of target components based on the configuration parameters in the standardized configuration files, the standardized metadata comprising a data attribute and a data storage location; and
    using one of the target components that generate the standardized metadata as the standardized component.

3. The method according to claim 1, wherein
    the standardized component comprises a core component and an extension component, the core component is a general-purpose component configured to construct the machine learning model, and the extension component is a functional component configured to extend the machine learning model; and
    the performing scheduling processing on the plurality of standardized components comprised in the pipeline comprises:
    invoking execution logic of the core component to obtain a scheduling result of the core component; and
    invoking execution logic of the extension component with reference to the scheduling result of the core component, to obtain a scheduling result of the extension component.

4. The method according to claim 1, wherein
    the plurality of standardized components comprise a custom component;
    the method further comprises:
    performing component customization processing to obtain the custom component; and
    saving the custom component; and
    the performing scheduling processing on the plurality of standardized components comprised in the pipeline comprises:
    invoking execution logic of the custom component to obtain a scheduling result of the custom component.

5. The method according to claim 1, wherein the performing scheduling processing on the plurality of standardized components comprised in the pipeline comprises:
    performing scheduling processing on a first standardized component in the pipeline to obtain a scheduling result of the first standardized component; and
    performing scheduling processing on an (i+1)th standardized component based on a scheduling result of an ith standardized component according to a data flow from the ith standardized component to the (i+2)th standardized component in the pipeline, to obtain a scheduling result of the (i+2)th standardized component;
    i being an incremental natural number, a value range being 1<i<M, M being a quantity of the standardized components, and M being an integer greater than 2.

6. The method according to claim 5, wherein the performing scheduling processing on an (i+1)th standardized component based on a scheduling result of an ith standardized component, to obtain a scheduling result of the (i+1)th standardized component comprises:
    parsing the scheduling result of the ith standardized component to obtain standardized metadata corresponding to the ith standardized component;
    performing scheduling task status query processing on the (i+1)th standardized component to obtain a task execution status of the (i+1)th standardized component; and
    performing, when the task execution status of the (i+1)th standardized component indicates that the (i+1)th standardized component needs to execute a scheduling task, scheduling processing on the (i+1)th standardized component based on the standardized metadata corresponding to the ith standardized component, to obtain the scheduling result of the (i+1)th standardized component.

7. The method according to claim 5, further comprising:
    obtaining the scheduling result of the ith standardized component from a meta database before the performing scheduling processing on an (i+1)th standardized component based on a scheduling result of an ith standardized component; and
    saving the scheduling result of the (i+1)th standardized component to the meta database after the performing scheduling processing on an (i+1)th standardized component based on a scheduling result of an ith standardized component.

8. The method according to claim 1, wherein
    the pipeline comprises an offline inference pipeline for the machine learning model that is offline and an online inference pipeline for the machine learning model that is online, and one of the plurality of standardized components comprises a monitoring component, an offline component for the offline inference pipeline, and an online component for the online inference pipeline;
    the performing scheduling processing on the plurality of standardized components comprised in the pipeline comprises:
    performing scheduling processing on the offline component to obtain an offline scheduling result of the machine learning model that is offline; and performing scheduling processing on the online component to obtain an online scheduling result of the machine learning model that is online; and the executing, based on a scheduling result, a machine learning task corresponding to the machine learning model comprises:

performing, by using the monitoring component, monitoring processing on the offline scheduling result and the online scheduling result, and executing, based on a monitoring result, the machine learning task corresponding to the machine learning model.

9. The method according to claim 1, wherein the determining a plurality of target components from candidate components configured to construct a machine learning model comprises:

displaying, in a human-machine interaction interface, a candidate component configured to construct a machine learning model; and using a selected candidate component as the target component in response to a selection operation for the candidate component.

10. The method according to claim 1, wherein the method further comprises:

displaying the plurality of target components in a human-machine interaction interface; and constructing, in response to a connection operation for the plurality of target components, a connection relationship between the target components corresponding to the connection operation.

11. The method according to claim 1, further comprising:
for a first standardized component of the plurality of standardized components:

obtaining an input data type and an output data type of the first standardized component;

constructing a directed connection relationship from a second standardized component of the plurality of standardized components to the first standardized component when the input data type of the first standardized component matches an output data type of the second standardized component; and constructing a directed connection relationship from the first standardized component to a third standardized component of the plurality of standardized components when the output data type of the standardized component matches an input data type of the third standardized component.

12. A pipeline-based machine learning apparatus, comprising:

at least one memory, configured to store computer executable instructions; and at least one processor, configured to: when executing the computer executable instructions stored in the at least one memory, implement:

determining a plurality of target components from candidate components configured to construct a machine learning model;

performing standardization processing on input data and output data of the plurality of target components to obtain a plurality of standardized components respectively corresponding to the plurality of target components;

assembling, based on a connection relationship between the plurality of standardized components, the plurality of standardized components into a pipeline corresponding to the machine learning model;

performing scheduling processing on the plurality of standardized components comprised in the pipeline, to obtain a scheduling result; and executing, based on the scheduling result, a machine learning task corresponding to the machine learning model.

13. The apparatus according to claim 12, wherein the performing standardization processing on input data and output data of the plurality of target components to obtain standardized components respectively corresponding to the plurality of target components comprises:

obtaining standardized configuration files for the plurality of target components;

the standardized configuration files comprising configuration parameters of the input data and the output data of the plurality of target components;

generating standardized metadata of the input data and the output data of the plurality of target components based on the configuration parameters in the standardized configuration files, the standardized metadata comprising a data attribute and a data storage location; and using one of the target components that generate the standardized metadata as the standardized component.

14. The apparatus according to claim 12, wherein the standardized component comprises a core component and an extension component, the core component is a general-purpose component configured to construct the machine learning model, and the extension component is a functional component configured to extend the machine learning model; and the performing scheduling processing on the plurality of standardized components comprised in the pipeline comprises:

invoking execution logic of the core component to obtain a scheduling result of the core component; and invoking execution logic of the extension component with reference to the scheduling result of the core component, to obtain a scheduling result of the extension component.

15. The apparatus according to claim 12, wherein the plurality of standardized components comprise a custom component; and the at least one processor is further configured to perform:
performing component customization processing to obtain the custom component; and saving the custom component; and the performing scheduling processing on the plurality of standardized components comprised in the pipeline comprises:

invoking execution logic of the custom component to obtain a scheduling result of the custom component.

16. The apparatus according to claim 12, wherein the performing scheduling processing on the plurality of standardized components comprised in the pipeline comprises:

performing scheduling processing on a first standardized component in the pipeline to obtain a scheduling result of the first standardized component; and performing scheduling processing on an (i+1)th standardized component based on a scheduling result of an ith standardized component according to a data flow from the ith standardized component to the (i+1)th standardized component in the pipeline, to obtain a scheduling result of the (i+1)th standardized component;

i being an incremental natural number, a value range being 1<i<M, M being a quantity of the standardized components, and M being an integer greater than 2.

17. The apparatus according to claim 16, wherein the performing scheduling processing on an (i+1)th standardized component based on a scheduling result of an ith standardized component, to obtain a scheduling result of the (i+1)th standardized component comprises:
- parsing the scheduling result of the ith standardized component to obtain standardized metadata corresponding to the ith standardized component;
- performing scheduling task status query processing on the (i+1)th standardized component to obtain a task execution status of the (i+1)th standardized component; and
- performing, when the task execution status of the (i+1)th standardized component indicates that the (i+1)th standardized component needs to execute a scheduling task, scheduling processing on the (i+1)th standardized component based on the standardized metadata corresponding to the ith standardized component, to obtain the scheduling result of the (i+1)th standardized component.

18. The apparatus according to claim 16, wherein the at least one processor is further configured to perform:
- obtaining the scheduling result of the ith standardized component from a meta database before the performing scheduling processing on an (i+1)th standardized component based on a scheduling result of an ith standardized component; and
- saving the scheduling result of the (i+1)th standardized component to the meta database after the performing scheduling processing on an (i+1)th standardized component based on a scheduling result of an ith standardized component.

19. The apparatus according to claim 12, wherein
the pipeline comprises an offline inference pipeline for the machine learning model that is offline and an online inference pipeline for the machine learning model that is online, and one of the plurality of standardized components comprises a monitoring component, an offline component for the offline inference pipeline, and an online component for the online inference pipeline;
the performing scheduling processing on the plurality of standardized components comprised in the pipeline comprises:
- performing scheduling processing on the offline component to obtain an offline scheduling result of the machine learning model that is offline; and
- performing scheduling processing on the online component to obtain an online scheduling result of the machine learning model that is online; and the executing, based on a scheduling result, a machine learning task corresponding to the machine learning model comprises:
- performing, by using the monitoring component, monitoring processing on the offline scheduling result and the online scheduling result, and executing, based on a monitoring result, the machine learning task corresponding to the machine learning model.

20. A non-transitory computer readable storage medium, storing computer executable instructions, the computer executable instructions, when executed by at least one processor, causing the at least one processor to perform:
- determining a plurality of target components from candidate components configured to construct a machine learning model;
- performing standardization processing on input data and output data of the plurality of target components to obtain a plurality of standardized components respectively corresponding to the plurality of target components;
- assembling, based on a connection relationship between the plurality of standardized components, the plurality of standardized components into a pipeline corresponding to the machine learning model;
- performing scheduling processing on the plurality of standardized components comprised in the pipeline, to obtain a scheduling result; and
- executing, based on the scheduling result, a machine learning task corresponding to the machine learning model.

* * * * *